United States Patent [19]
Johnson

[11] Patent Number: 5,850,490
[45] Date of Patent: Dec. 15, 1998

[54] ANALYZING AN IMAGE OF A DOCUMENT USING ALTERNATIVE POSITIONINGS OF A CLASS OF SEGMENTS

[75] Inventor: Walter A. L. Johnson, Santa Clara, Calif.

[73] Assignee: Xerox Corporation, Stamford, Conn.

[21] Appl. No.: 560,172

[22] Filed: Nov. 17, 1995

Related U.S. Application Data

[63] Continuation of Ser. No. 173,750, Dec. 22, 1993, abandoned.

[51] Int. Cl.$^6$ .............................. G06K 9/54; G06K 9/60; G06K 9/70; G06K 9/36
[52] U.S. Cl. ......................... 382/306; 382/282; 382/173; 358/453; 707/530
[58] Field of Search .................................... 382/100, 282, 382/173, 176, 180, 305, 306; 345/118, 439; 358/453, 403, 404; 707/2, 539, 540, 530

[56] References Cited

U.S. PATENT DOCUMENTS

| | | | |
|---|---|---|---|
| 4,574,395 | 3/1986 | Kato | 382/306 |
| 4,632,252 | 12/1986 | Haruki et al. | 382/1 |
| 4,783,825 | 11/1988 | Hirose et al. | 382/1 |
| 4,845,761 | 7/1989 | Cate et al. | 382/1 |
| 4,908,873 | 3/1990 | Philibert et al. | 382/34 |
| 4,912,771 | 3/1990 | Komine et al. | 382/305 |
| 5,060,980 | 10/1991 | Johnson et al. | 283/70 |
| 5,084,769 | 1/1992 | Miura | 358/403 |
| 5,228,100 | 7/1993 | Takeda et al. | 382/61 |
| 5,265,242 | 11/1993 | Fujisawa et al. | 395/600 |

(List continued on next page.)

FOREIGN PATENT DOCUMENTS

| | | |
|---|---|---|
| 0544431 | 6/1993 | European Pat. Off. . |
| 0544432 | 6/1993 | European Pat. Off. . |

OTHER PUBLICATIONS

Spitz, A. Lawrence, "Style Directed Document Recognition," Proceedings of the First International Conference on Document Analysis and Recognition, St. Malo, France, 1991, pp. 611–619.

Wiederhold, Gio, *File Organization for Database Design*, McGraw–Hill Book Company, 1987, pp. 350–359.

Story, G. A., O'Gorman, L., Fox, D., Schaper, L. L., and Jagadish, H. V., "The RightPages Image–Based Electronic Library for Alerting and Browsing," *Computer*, vol. 25, No. 9, Sep. 1992, pp. 17–25.

(List continued on next page.)

*Primary Examiner*—Bipin Shalwala

[57] ABSTRACT

Stored alternative position data indicate alternative positionings of a class of document segments. Data are obtained that define an image set showing a document. An alternative identifier identifying one of the alternative positionings is also obtained. The alternative identifier, the alternative position data, and the data defining the image set are used to obtain segment data defining a segment of the image set. The segment is in the class of document segments. The segment is also at the position indicated by the alternative position data for the identified positioning. To store the document in a database, the segment data and a document identifier can be stored so that a search can determine that the segment is from the document. Similarly, the segment data and a segment class identifier can be stored so that a search can determine that the segment is in the identified class of document segments. The alternative position data can include, for each of a number of document classes, a schema indicating a position for the class of document segments. For example, a schema can indicate a segment's position relative to a document or relative to other classes of document segments. The user can mark a form to indicate one of the alternative positionings. The form can show a positioning for each class of documents, can show several positionings for a number of classes of document segments, or can show names of a number of document classes.

20 Claims, 16 Drawing Sheets

U.S. PATENT DOCUMENTS

| | | | |
|---|---|---|---|
| 5,267,303 | 11/1993 | Johnson et al. | 379/100 |
| 5,282,052 | 1/1994 | Johnson et al. | 358/402 |
| 5,313,572 | 5/1994 | Yamamoto et al. | 382/306 |
| 5,317,646 | 5/1994 | Sang, Jr. et al. | 382/9 |
| 5,339,172 | 8/1994 | Robinson | 358/462 |
| 5,363,214 | 11/1994 | Johnson | 358/462 |
| 5,434,933 | 7/1995 | Karnin et al. | 382/317 |
| 5,542,002 | 7/1996 | Choate et al. | 382/306 |
| 5,625,770 | 4/1997 | Nomura | 382/306 |
| 5,724,579 | 3/1998 | Suzuki | 382/305 |

OTHER PUBLICATIONS

Johnson, W., Jellinek, H., Klotz Jr., L., Rao, R., and Card, S., "Bridging the Paper and Electronic Worlds: The Paper User Interface," *INTERCHI '93 Conference Proceedings,* Apr. 24–29, 1993, ACM, New York, 1993, pp. 507–512.

*Using PaperWorks™ on a PC.,* Xerox Corporation, 1992, pp. 71–85.

*Using PaperWorks™ from a Fax Machine.,* Xerox Corporation, 1992, pp. 20–23 and 36.

*Learning Lexis®* , Mead Data Central, Inc., 1992, pp. 12, 13, and 19.

*Westlaw Reference Manual,* Fourth Edition, West Publishing Company, 1990, pp. 47–70, 99, 100, and 117–119.

Imagio MF530 Model 3 sales brochure, Ricoh Corporation, Jan. 1993.

Kisa, K., Yamada, K., Tanaka, N., Babaguchki, N., and Tezuka, Y., "Visiting Card Understanding System," *9th International Conference on Pattern Recognition,* 14–17 Nov. 1988, vol. I, pp. 425–429.

Rao, R., Card, S. K., Johnson, W., Klotz, L., and Trigg, R. H., "Protofoil: Storing and Finding the Information Worker's Paper Documents in an Electronic File Cabinet," *CHI '94 Conference Proceedings,* Boston, Mass., Apr. 24–28, 1994, pp. 180–185.

Wayner, P., "Optimal Character Recognition," *Byte,* Dec., 1993, pp. 203, 204, 206, 208, and 210.

Patent Abstracts of Japan, Publication No. JP59103460, Publication Date: Jun. 14, 1984, vol., 8, No. 221, Abstract Date: Oct. 9, 1984.

| Document Class R | | | | |
|---|---|---|---|---|
| Document ID | Segment Class 1 | Segment Class 2 | Segment Class 3 | ... |
| 0001 | Cowherds of the Deep | Snoopy | It was a dark... | ... |
| ⋮ | | | | |

# ANALYZING AN IMAGE OF A DOCUMENT USING ALTERNATIVE POSITIONINGS OF A CLASS OF SEGMENTS

This is a continuation of application Ser. No. 08/173,750, filed Dec. 22, 1993, now abandoned.

BACKGROUND OF THE INVENTION

The present invention relates to data filing techniques.

Spitz, A. L., "Style Directed Document Recognition," Proceedings of the First International Conference on Document Analysis and Recognition, St. Malo, France, 1991, pp. 611–619, describes a document recognition system. Pages 613–614 describe style directed recognition processing. FIG. 1 shows a style encoding for first pages of articles in IEEE transactions. The encoding shows page frame coordinates and constraints on the title block. The position of the bottom of the title block is undefined, and depends on the amount of vertical space occupied by the title. The position of the top of the author block depends on the bottom of the title block. In the recognition process, documents are continuously checked against the style encoding for compliance. In determining the internal layout structure of the document image, dimensions expressed in the style encoding are used as hints-starting points in a search for the dimensions in pixel space that indicate the position and size of page elements. In segmentation, horizontal rivers of white space delineate headers and footers from the remainder of the page, which is processed by looking for vertical rivers that separate the page into columns. Location and dimensions of columns are found based on expected locations and dimensions and by having contents consistent with the style definition. FIG. 2 shows a schematic representation of the process flow. Segment and content information is encoded in an intermediate tree representation describing the layout and logical structure of a document. Pages 614–616 describe the language used for style representation, FIG. 3 shows images of first pages of articles from IEEE Transactions. FIG. 4 shows location and dimensions of content frames on IEEE Transactions first page. FIG. 5 shows the top portion of an IEEE Transaction first page and the initial portion of recognition output generated from it. The conclusion, at page 617–619, states that it remains to test whether documents of differing style are well recognized with appropriate style encoding.

SUMMARY OF THE INVENTION

The invention deals with a basic problem in analyzing data that define an image set showing a document. For efficiency, it is often useful to handle different segments of a document separately; for example, a filing operation could use segments such as title, author, abstract, and so forth to create an index. But conventional techniques have limited facilities for obtaining segments from data that define an image set showing a document.

The invention is based on the discovery of a technique that enables a user to quickly scan a document and obtain data defining a specific segment of the document. The technique obtains an alternative identifier identifying one of a set of alternative positionings that a class of document segments could have. The technique then obtains segment data indicating a segment of the document's image that is in the class of document segments and has the alternative positioning.

The technique can be implemented, for example, by storing alternative position data indicating a position for each of a set of alternative positionings that a class of document segments could have. Then, the alternative identifier, the alternative position data, and image set data defining an image set showing the document can be used to obtain the segment data; the segment data define a segment of the image set that is in the class of document segment and that is at the position indicated by the alternative position data for the alternative positioning identified by the alternative identifier.

The alternative position data can include a schema for each of a set of classes of documents. Each document class' schema can indicate a position for each class of document segments that occurs in documents in the class. Positions can be indicated relative to a document, such as in relation to an edge or corner of a specified page, or relative to other classes of document segments within a document.

The data that indicate the image set showing the document can also indicate the alternative identifier. For example, the image set can show a form with a field for each of the alternative positionings. The form can be automatically produced using the alternative position data. Each field can show a positioning of several classes of document segments, or each field can show a positioning of one document segment on a page. Each field can alternatively include a check box and a name of a document class, such as a name of a journal.

The technique can obtain the segment data by first using the alternative identifier and the alternative position data to obtain the position of the segment. Then the technique can use the segment's position and the image set data to obtain the segment data.

The technique can be applied, for example, in a database system to index a document through a number of classes of document segments. The technique can store data associating the segment data with a segment class identifier identifying the class of document segments and with a document identifier identifying the document. As a result, a search can determine that the segment defined by the segment data is in the identified class and is a segment of the identified document, making it possible to retrieve the document from the segment data. Recognition can be performed on a segment to obtain its text, in which case the search can use keywords.

The technique can be implemented with a machine that includes image input circuitry, alternative position data, and data indicating image processing instructions that the machine's processor can execute. The alternative position data indicate a position for each of a set of two or more alternative positionings that a class of document segments could have. The input circuitry can receive input image data defining an image set that shows a document. The processor can obtain an alternative identifier identifying one of the alternative positionings. The processor can use the alternative identifier, the alternative position data, and the image set data to obtain segment data. The segment data define a segment of the image set that is in the class of document segments and that is in the position indicated by the alternative position data for the alternative positioning identified by the alternative identifier. The machine can be a high-speed image processing server that responds to image processing requests from a network to which it is connected.

The machine can also include image output circuitry, and the processor can use the alternative position data to obtain form data defining a form that shows each of the set of alternative positionings. Then the image set can include a marked version of the form, and the processor can obtain the alternative identifier using the data defining the marked version of the form. The machine can be a fax server or a copier.

A machine implementing the invention can include a database system. The processor can store the segment data and the document image data and can obtain data associating the segment data and the document image data in the database system.

The technique can also be implemented in a software product or other article of manufacture that includes a storage medium and data stored by the storage medium. The product can be used in a machine that includes image input circuitry. The data stored by the storage medium can include alternative position data, and data indicating image processing instructions that the machine's processor can execute. The alternative position data indicate a position for each of a set of two or more alternative positionings that a class of document segments could have. In executing the image processing instructions, the processor receives image set data from the image input circuitry defining an image set that shows a document. The processor can obtain an alternative identifier identifying one of the alternative positionings. The processor can use the alternative identifier, the alternative position data, and the image set data to obtain segment data. The segment data define a segment of the image set that is in the class of document segments and that is in the position indicated by the alternative position data for the alternative positioning identified by the alternative identifier.

The technique described above is advantageous because it enables a user to provide information to an image processing system about positioning of segments within a document. The user can provide the information on a form or display, so that the document is not damaged. A form can be used even where a keyboard or other apparatus is not available, using facsimile transmission. The form can assist the user by showing alternative positionings so that a user has no difficulty selecting one and making a mark that clearly indicates the selected positioning. As a result, the system can effectively label and extract segments of the document and use them to index the document in a filing system.

The technique can also be extended to perform batch mode document storage, helping to minimize a user's time investment.

The following description, the drawings, and the claims further set forth these and other aspects, objects, features, and advantages of the invention.

DETAILED DESCRIPTION

A. Conceptual Framework

Figure 1:
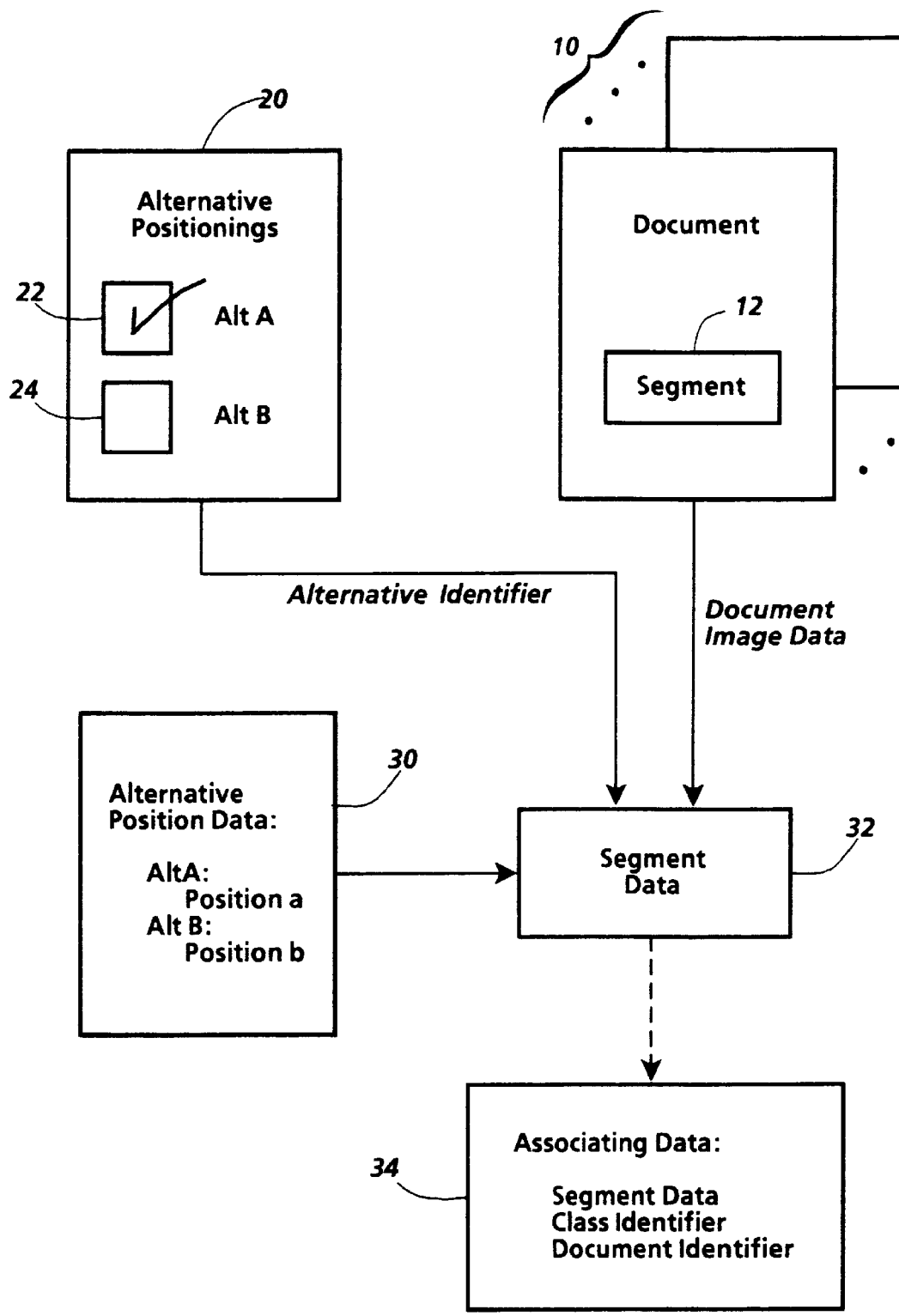
FIG. 1 is a schematic diagram illustrating how an image set showing a document can be analyzed using alternative position data indicating alternative positionings of a class of document segments.

The following conceptual framework is helpful in understanding the broad scope of the invention, and the terms defined below have the indicated meanings throughout this application, including the claims.

The term "data" refers herein to physical signals that indicate or include information. When an item of data can indicate one of a number of possible alternatives, the item of data has one of a number of "values." For example, a binary item of data, also referred to as a "bit," has one of two values, interchangeably referred to as "1" and "0" or "ON" and "OFF" or "high" and "low."

The term "data" includes data existing in any physical form, and includes data that are transitory or are being stored or transmitted. For example, data could exist as electromagnetic or other transmitted signals or as signals stored in electronic, magnetic, or other form.

"Circuitry" or a "circuit" is any physical arrangement of matter that can respond to a first signal at one location or time by providing a second signal at another location or time. Circuitry "stores" a first signal when it receives the first signal at one time and, in response, provides substantially the same signal at another time.

A "data storage medium" or "storage medium" is a physical medium that can store data. Examples of data storage media include magnetic media such as diskettes, floppy disks, and tape; optical media such as laser disks and CD-ROMs; and semiconductor media such as semiconductor ROMs and RAMs. As used herein, "storage medium" covers one or more distinct units of a medium that together store a body of data. For example, a set of floppy disks storing a single body of data would together be a storage medium.

A "storage medium access device" is a device that includes circuitry that can access data on a data storage medium. Examples include drives for reading magnetic and optical data storage media.

"Memory circuitry" or "memory" is any circuitry that can store data, and may include local and remote memory and input/output devices. Examples include semiconductor ROMs, RAMs, and storage medium access devices with data storage media that they can access.

A "data processing system" is a physical system that processes data. A "data processor" or "processor" is any component or system that can process data, and may include one or more central processing units or other processing components. A processor performs an operation or a function "automatically" when it performs the operation or function independent of concurrent human control. Any two components are "connected" when there is a combination of circuitry that can transfer signals from one of the components to the other.

A processor "accesses" an item of data in memory by any operation that retrieves or modifies the item, such as by reading or writing a location in memory that includes the item. A processor can be "connected for accessing" an item of data by any combination of connections with local or remote memory or input/output devices that permits the processor to access the item.

A processor or other component of circuitry "uses" an item of data in performing an operation when the result of the operation depends on the value of the item. For example, the operation could perform a logic or arithmetic operation on the item or could use the item to access another item of data.

An "instruction" is an item of data that a processor can use to determine its own operation. A processor "executes" a set of instructions when it uses the instructions to determine its operations.

A signal "requests" or "is a request for" an event or state when the signal can cause occurrence of the event or state.

To "obtain" or "produce" an item of data is to perform any combination of operations that begins without the item of data and that results in the item of data. An item of data can be "obtained" or "produced" by any operations that result in the item of data. An item of data can be "obtained from" or "produced from" other items of data by operations that obtain or produce the item of data using the other items of data.

An item of data "identifies" or "is an identifier of" one of a set of identifiable items if the item of data is one of a set of items of data, each of which can be mapped to at most one of the identifiable items.

A first item of data "indicates" a second item of data when the second item of data can be obtained from the first item of data. The second item of data can be accessible using the first item of data. Or the second item of data can be obtained by decoding the first item of data. Or the first item of data can be an identifier of the second item of data. For example, an item of data may indicate a set of instructions a processor can execute or it may indicate an address.

An item of data "indicates" a thing, an event, or a characteristic when the item has a value that depends on the existence or occurrence of the thing, event, or characteristic or on a measure of the thing, event, or characteristic.

An item of data "includes" information indicating a thing, an event, or a characteristic if data indicating the thing, event, or characteristic can be obtained by operating on the item of data. Conversely, an item of information that indicates a thing, an event, or a characteristic can be said to "include" an item of data if data indicating the thing, event, or characteristic can be obtained by operating on the item of data.

An operation or event "transfers" an item of data from a first component to a second if the result of the operation or event is that an item of data in the second component is the same as an item of data that was in the first component prior to the operation or event. The first component "provides" the data, and the second component "receives" or "obtains" the data.

An "array of data" or "data array" or "array" is a combination of items of data that can be mapped into an array. A "two-dimensional array" is a data array whose items of data can be mapped into an array having two dimensions.

An item of data "defines" an array when it includes information sufficient to obtain or produce the array. For example, an item of data defining an array may include the defined array itself, a compressed or encoded form of the defined array, a pointer to the defined array, a pointer to a part of another array from which the defined array can be obtained, or pointers to a set of smaller arrays from which the defined array can be obtained.

An "image" is a pattern of physical light. An "image set" is a set of one or more images.

An image may be divided into "segments," each of which is itself an image. A segment of an image may be of any size up to and including the whole image.

An item of data "defines" an image when the item of data includes sufficient information to produce the image. For example, a two-dimensional array can define all or any part of an image, with each item of data in the array providing a value indicating the color of a respective location of the image.

An item of data "defines" an image set when the item of data includes sufficient information to produce all the images in the set.

An image or image set "includes" information indicating a thing, an event, or a characteristic if an item of data indicating the thing, event, or characteristic can be obtained by operating on an item of data defining the image or image set.

A "data transmission" is an act that physically transmits data from one location to another. A "facsimile transmission" is a data transmission in which the transmitted data define an image set according to a standard format. An "image destination" is a machine or other destination to which data defining an image can be transmitted. A "fax machine" is a machine with circuitry that can receive and provide facsimile transmissions. Therefore, the telephone number of a fax machine is an example of information that indicates an image destination.

A "marking medium" is a physical medium on which a human can produce a pattern of marks by performing marking actions or by performing actions that modify marks, such as erasing, wiping, or scratching actions. Common examples of marking media include sheets of paper and plastic, although humans can produce patterns of marks on an enormous variety of media. As used herein, "marking medium" covers one or more distinct units of a medium on which, together, a human has produced a pattern of related marks. For example, a set of paper pages that form a handwritten letter would be a single marking medium. Also, as used herein, "marking medium" includes a marking surface of an electronic device that can sense marks, such as a tablet, a touch- or signal-sensitive display, or another pen- or stylus-based input device.

A human "marks" a marking medium or "makes a mark on" a marking medium by performing any action that produces or modifies marks on the marking medium; a human may mark a marking medium, for example, with marking, stamping, erasing, wiping, or scratching actions.

The term "mark" includes a single mark and also plural marks that together form a pattern of marks.

The terms "form" and "field" are related: A marking medium may be an instance of a "form," in which case the marking medium has a set of "fields," each of which can be marked in an appropriate way to indicate information. A field may also include information indicating how it should be marked or indicating how a mark in the field is interpreted. For example, a field may include a "check box" indicating a region within which a check-like mark should be made. A field may include one or more fields within it. In addition to its fields, a form can include additional information such as machine-readable or human-readable information identifying the form.

A mark "indicates" a thing, an event, or a characteristic when the presence or shape of the mark depends on the existence or occurrence of the thing, event, or characteristic or on a measure of the thing, event, or characteristic.

A mark in a field "indicates" a thing, an event, or a characteristic when the presence or shape of the mark depends on the existence or occurrence of the thing, event, or characteristic or on a measure of the thing, event, or characteristic. A field is "for indicating" or "can be marked to indicate" a thing, an event, or a characteristic when one or more appropriate marks in the field would indicate the thing, event, or characteristic. A field "indicates" a thing, an event, or a characteristic when one or more marks in the field indicate the thing, event, or characteristic.

One type of event that can be indicated by a mark in a field is a "request" for an operation, meaning that the mark indicates an action by a user intended to cause performance of the operation. For example, the field could include a check box for the mark and could also include information identifying the operation. An operation is performed "in response" to a field when the field is for indicating a request for the operation and a mark in the field indicating a request causes the operation to be performed.

An image "shows" a page, such as a page of a form or a sheet, when the image is an image of the page. An image set "shows" a page when the image set includes one or more images that, separately or in combination, show the page. An item of data "defines" a page when the item defines an image set that shows the page.

An item of data defines an image that shows a "field that has been marked" or a "field that is marked" or a "field being marked" when the item defines an image of the field that includes features that would be interpreted as one or more marks in the field if the defined image were interpreted according to a definition of a form that includes the field. An item of data defines an image set that shows a "form that has been marked" or a "form that is marked" when the item defines an image of the form that shows at least one field that has been marked. Therefore, an item of data defining an image set that shows a form that has been marked can be produced in a number of ways: For example, a form on a marking medium can be marked by hand or by typing and then the form can be scanned or facsimile transmitted; or editing software can respond to user actions such as mouse and keyboard clicks by modifying an item of data defining an image of the form so that it includes features that would be interpreted as marks.

A "version" of a first image is a second image produced using an item of data defining the first image and that includes information from the first image. The second image may be identical to the first image, or it may be modified by loss of resolution, by changing the data defining the first image, or by other processes that result in a modified version.

A "marked version" of a form is the form with a mark in one of its fields.

An operation "creates" a page, such as a page of a form or a sheet, when the operation produces an item of data defining the page.

Each location in an image may be called a "pixel." In an array defining an image in which each item of data provides a value, each value indicating the color of a location may be called a "pixel value."

"Character" means a discrete element that appears in a written or printed form of a language. Characters in the English language can thus include not only alphabetic and numerical elements, but also punctuation marks, diacritical marks, mathematical and logical symbols, and other elements used in written or printed English. More generally, characters can include, in addition to alphanumeric elements, phonetic, ideographic, or pictographic elements.

A "word" is a set of one or more characters that is treated as a semantic unit in a language.

A "text" is a sequence of characters; the characters of a text may form words and other subsequences within the text.

A "character type" is a category of which a character may be an instance, such as the letter "a" or the number "3". A "version of a character type made by a human by hand" is a set of one or more marks made by the human by hand that are intended to be an instance of the character type.

An operation "recognizes" marks if the operation uses data defining an image of the marks to obtain data indicating a character type or other category of which the marks are likely to be an instance.

An operation "performs recognition" on a segment of an image or image set when the operation recognizes marks in the segment.

A "constraint" on segments of images or image sets is a requirement or other limitation that the segments must satisfy.

An operation uses data to "determine" whether a proposition is true if the operation uses the data to obtain other data indicating whether the proposition is true.

"Image input circuitry" is circuitry for obtaining data defining images as input.

An "image input device" is a device that can receive an image and provide an item of data defining a version of the image. A "scanner" is an image input device that receives an image by a scanning operation, such as by scanning a document.

"User input circuitry" or "user interface circuitry" is circuitry for providing signals based on actions of a user. User input circuitry can receive signals from one or more "user input devices" that provide signals based on actions of a user, such as a keyboard, a mouse, a joystick, a touch screen, and so forth. The set of signals provided by user input circuitry can therefore include data indicating mouse operation, data indicating keyboard operation, and so forth. Signals from user input circuitry may include a "request" for an operation, in which case a system may perform the requested operation in response.

"Image output circuitry" is circuitry for providing data defining images as output.

An "image output device" is a device that can provide output defining an image.

A "display" is an image output device that provides information in a visible form. A display may, for example, include a cathode ray tube; an array of light emitting, reflecting, or absorbing elements; a structure that presents marks on paper or another medium; or any other structure capable of defining an image in a visible form. To "present an image" on a display is to operate the display so that a viewer can perceive the image.

A "printer" is an image output device that provides an output image in the form of marks on a marking medium.

A "class of documents" is a category of which a document may be an instance. Some familiar names for classes of documents include article, pleading, memorandum, and so forth.

An image or image set "shows" a document when the image or image set shows each page of the document.

A "document segment" is a segment of an image or image set that shows a document.

A "class of document segments" is a category of which a document segment may be an instance. Some familiar classes of document segments include title, author, abstract, body, journal, date, sender, recipient, subject, plaintiff, defendant, court, and so forth.

A segment is "in" a class of document segments if the segment is a document segment that is an instance of the class of document segments.

An item of data indicates a "position" of a document segment if the item of data can be used to locate the document segment within a document. An item of data indicates a "position" of a class of document segments if the item of data can be used to locate document segments that are in the class within documents.

An item of data indicates a position of a document segment or a class of document segments "relative to a document" when the item of data can be used to locate the segment from one or more reference points of the document, such as pages, corners of pages, center points of page edges, or othe reference points.

An item of data indicates a position of a document segment or a class of document segments "relative to other classes of document segments" when the item of data can be used to locate the segment in relation to other segments. For example, the item of data could indicate an order in which classes of document segments occur in a document or could indicate a constraint on relative positions of document segments of different classes within a document.

A segment is "at" a position indicated by an item of data if the item of data can be used to locate the segment.

A "positioning" includes all positions that can be located using a single item of data indicating a position of a document segment or a class of document segments. An item of data "indicates a position for" a positioning if the item of data can be used to locate any of the positions included in the positioning. If positionings in a set of positionings are mutually exclusive, then the positionings are "alternative positionings." Therefore, a document segment that can be located using an item of data that indicates a position for one of a set of alternative positionings cannot be located using an item of data that indicates a position for a different one of the alternative positionings.

A class of document segments "has" or "could have" a set of alternative positionings if it is possible to locate at least one document segment in the class using an item of data that indicates a position for any one of the set of alternative positionings.

A field shows "a positioning of a document segment relative to a page of a document" when the field shows a representation of a page and, within the representation of the page, a representation of a positioning of the document segment. The representation of the positioning could, for example, be an outline of a representative position in the positioning.

A field shows "relative positionings" of classes of document segments for a class of documents when the field shows representations of the classes positioned relative to each other. The representation of each class could, for example, be an outline of a document segment in the class, and the outlines could be shown positioned relative to each other within a page.

An item of data includes a "description" of a form when the item of data can be used to determine whether or how a field of the form has been marked.

A "search" is an operation that is performed on two or more data items to select one of the data items. A subsequent operation can then be performed on the selected item of data.

A "database system" is a system that can store data items and data associating the stored data items so that the associating data can be used in a search of the stored data items.

A search "can determine" that a. proposition is true if the data items on which the search is performed are stored in a manner that indicates whether or not the proposition is true. For example, data defining a segment of an image or image set and a document identifier can be stored so that a search can determine whether the segment is from the identified document. Similarly, data defining a segment of an image or image set and an identifier of a class of document segments can be stored so that a search can determine whether the segment is in the class. A search can, for example, use associating data stored by a database system to determine whether propositions are true.

A "schema" for a class of documents is an item of data that represents the class of documents by indicating positions for classes of document segments.

B. General Features

Figure 2:
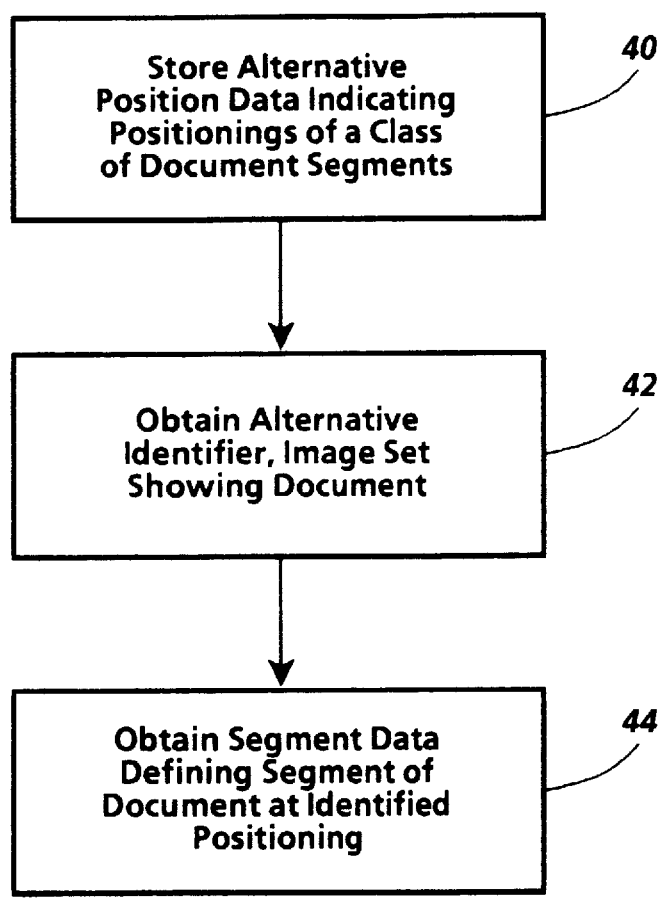
FIG. 2 is a flow chart showing general acts in analyzing an image showing a document using alternative position data indicating alternative positionings of a class of document segments.
Figure 3:
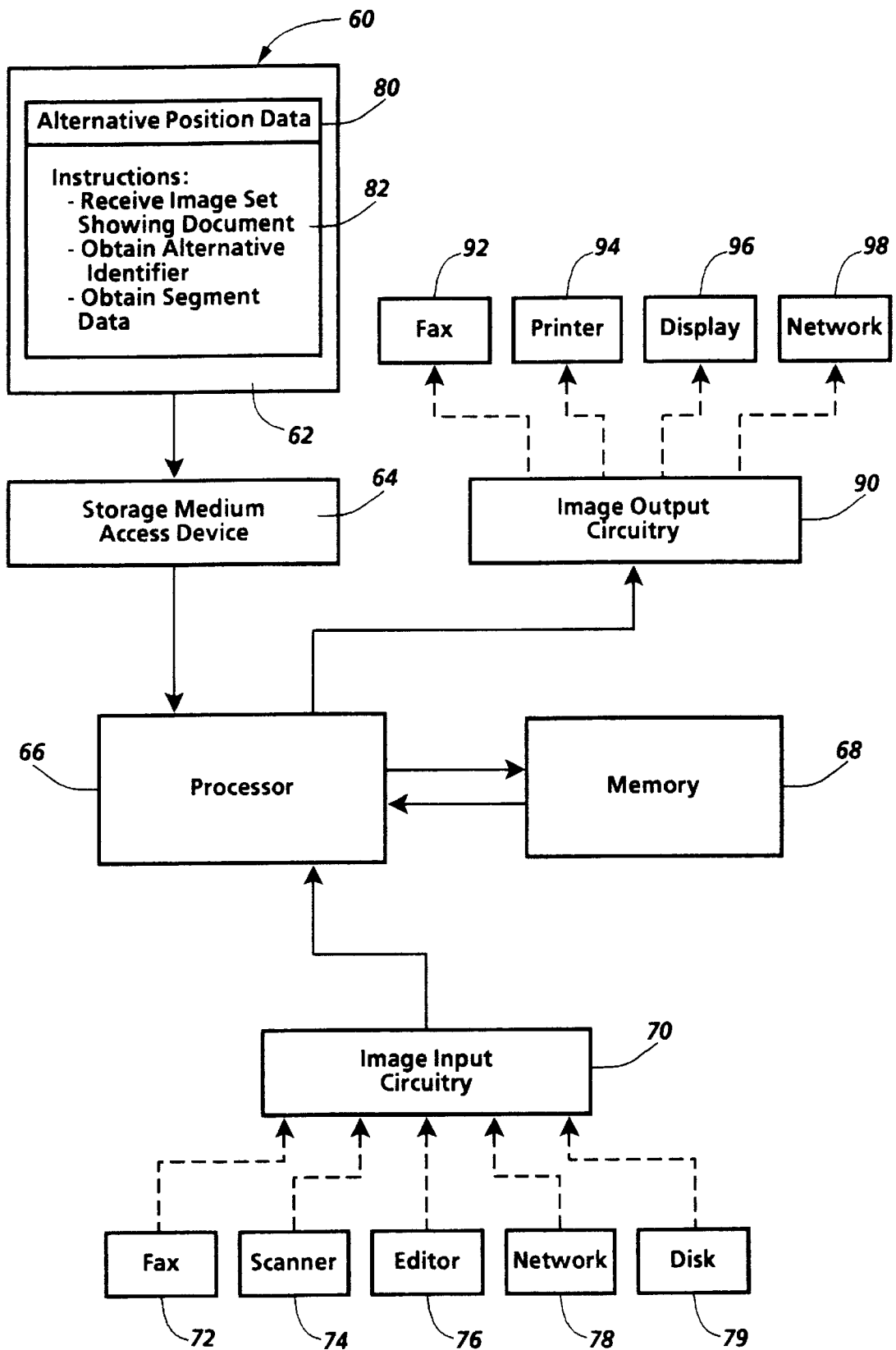
FIG. 3 is a schematic block diagram showing general components of a software product and a machine in which the software product can be used to implement the general acts in FIG. 2.

FIGS. 1–3 show general features of the invention. FIG. 1 shows schematically how an image set showing a document can be analyzed using alternative position data indicating alternative positionings of a class of document segments. FIG. 2 shows general acts in analyzing an image set showing a document can be analyzed using alternative position data indicating alternative positionings of a class of document segments. FIG. 3 shows general components of a software product and of a machine in which it can be used.

FIG. 1 shows document 10 with segment 12, which is an instance of a class of document segments. Form 20 can be marked to indicate one of a set of alternative positionings of segments in the class. Field 22 is marked to indicate a first alternative, "Alt A," and field 24 could be marked to indicate a second alternative, "Alt B."

FIG. 1 also shows alternative position data 30, indicating position a for positioning "Alt A" and position b for positioning "Alt B." A machine receiving data defining an image set that shows document 10 and form 20 can respond by using alternative position data 30 to automatically obtain segment data 32 defining segment 12. The machine could also respond, as the dashed line indicates, by automatically obtaining associating data 34, associating segment data 32 with a class identifier identifying the class of document segments that includes segment 12 and with a document identifier identifying document 10.

The general acts in FIG. 2 begin in box 40 by storing alternative position data indicating a position for each of a set of two or more alternative positionings that a class of document segments could have. The act in box 42 obtains image set data and an alternative identifier: The image set data define an image set showing a document; the alternative identifier identifies one of the set of alternative positionings. The act in box 44 uses the alternative position data from box 40 and the image set data and alternative identifier from box 42 to obtain segment data. The segment data define a segment of the image set that is in the class of document segments and that is at the position indicated by the alternative position data.

FIG. 3 shows software product 60, an article of manufacture that can be used in a system that includes components like those shown in FIG. 3. Software product 60 includes data storage medium 62 that can be accessed by storage medium access device 64. Data storage medium 62 could, for example, be a magnetic medium such as a set of one or more tapes, diskettes, or floppy disks; an optical medium such as a set of one or more CD-ROMs; or any other appropriate medium for storing data.

Data storage medium 62 stores data that storage medium access device 64 can provide to processor 66. Processor 66 is connected for accessing memory 68, which can include program memory storing data indicating instructions that processor 66 can execute and also data memory storing data that processor 66 can access in executing the instructions.

Processor 66 is also connected for receiving data defining images from image input circuitry 70. The data could be obtained from facsimile (fax) machine 72; from scanner 74; from editor 76, which could be a forms editor or other interactive image editor controlled by user input devices such as a keyboard and mouse or a pen- or stylus-based input device; from network 78, which could be a local area network or other network capable of transmitting data defining an image; or from disk 79, which could be a magnetic disk, an optical disk, or any other storage medium capable of storing data defining an image.

In addition to data storage medium 62, software product 60 includes data stored by storage medium 62. The stored data include alternative position data 80 indicating a position for each of a set of two or more alternative positionings that a class of document segments could have. The stored data also include data indicating image processing instructions 82, which processor 66 can execute to perform acts like those in FIG. 2. In executing instructions 82, processor 66 receives image set data defining an image set from image input circuitry 70. The input image set shows a document. Processor 66 also obtains an alternative identifier. Processor 66 then uses alternative position data 80, the image set data, and the alternative identifier to obtain segment data defining a segment of the image set that is in the class of document segments and that is at the position indicated by the alternative position data.

Processor 66 can also be connected for providing data defining images to image output circuitry 90. For example, software product 60 could include data indicating instructions processor 66 can execute to use alternative position data 80 to obtain form data defining a form that shows each of the set of alternative positionings. The form data could be provided to image output circuitry 90, and could in turn be provided to fax machine 92, to printer 94, to display 96, or to network 98.

C. Implementation

The general features described above could be implemented in numerous ways on various machines to analyze an image showing a document using alternative position data indicating alternative positionings that a class of document segments could have.

C.1. Alternative Position Data

Figure 4:
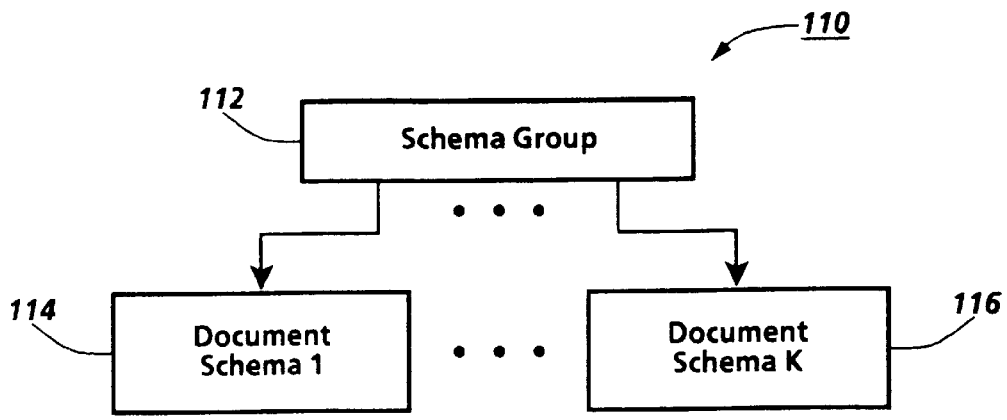
FIG. 4 is a schematic block diagram showing alternative position data that includes a group of document schema data items.
Figure 5:
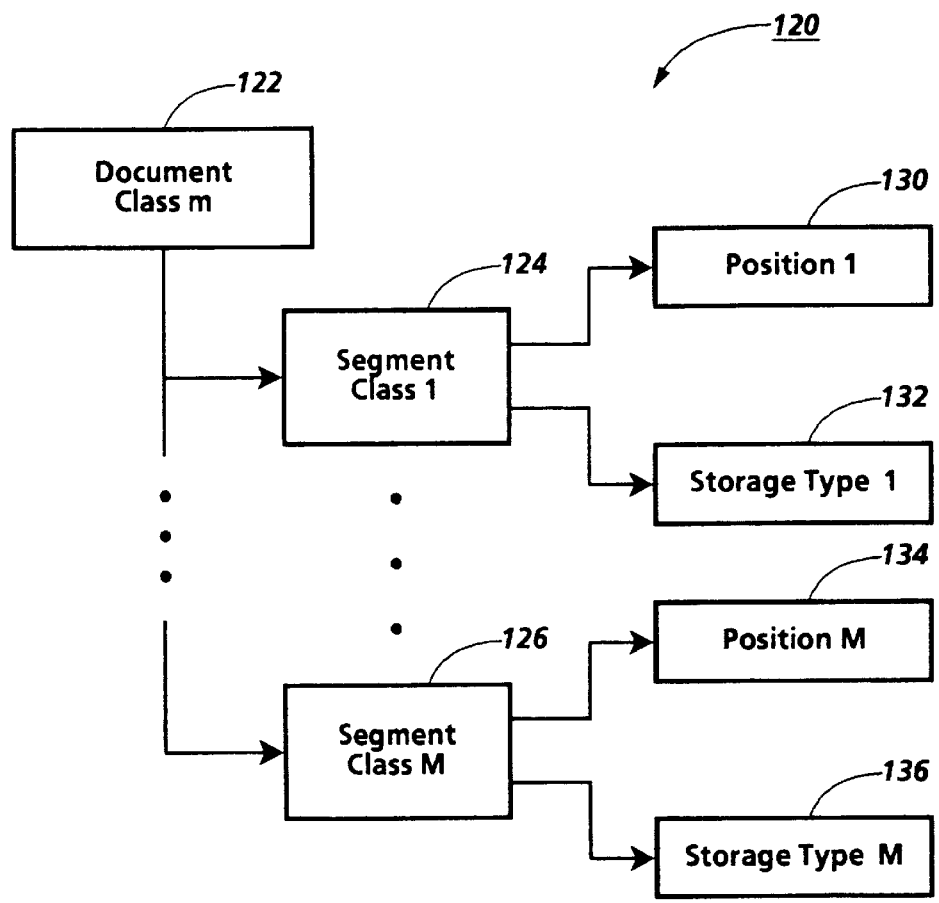
FIG. 5 is a schematic block diagram showing a document schema data item in which a segment class data item is linked to a position data item.
Figure 6:
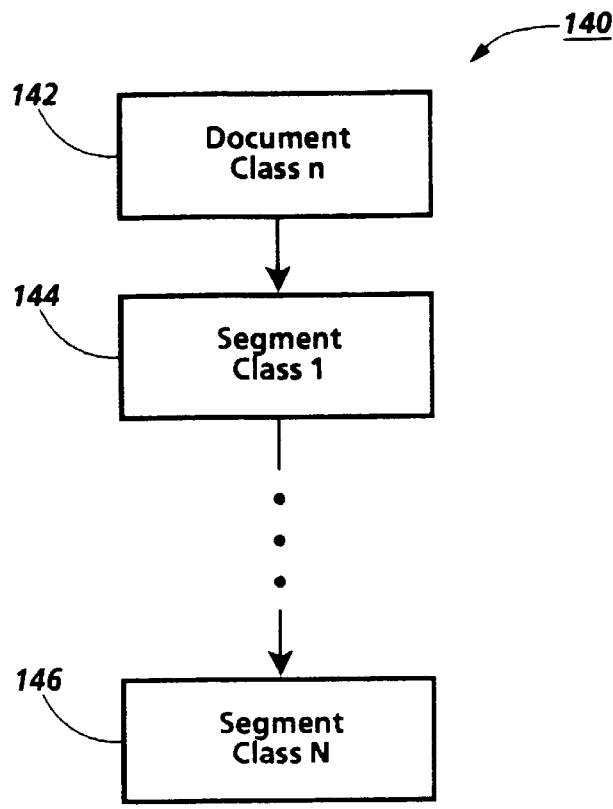
FIG. 6 is a schematic block diagram showing a document schema data item in which segment class data items are linked in a series according to position.
Figure 7:
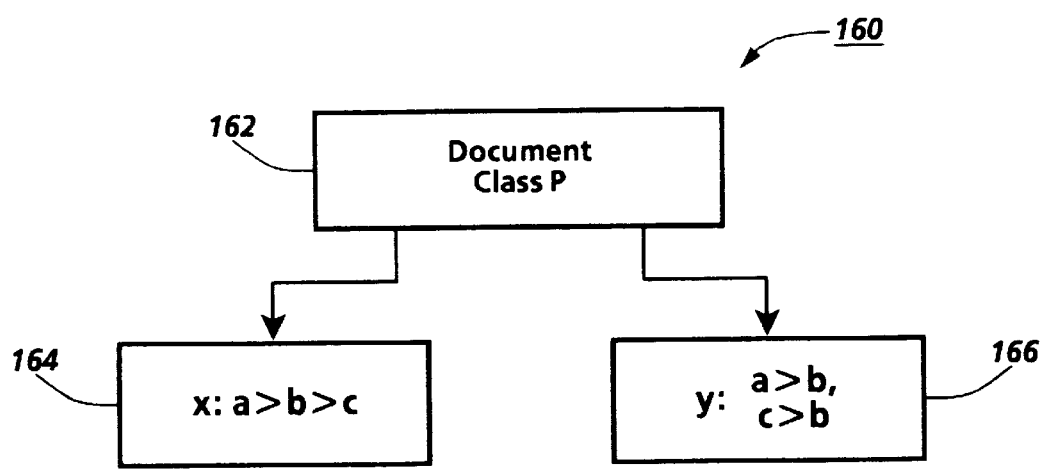
FIG. 7 is a schematic block diagram showing a document schema data item that includes data items indicating constraints on segment class positions in horizontal and vertical directions.

Alternative position data could take a variety of forms. FIG. 4 shows alternative position data that include a number of document schema. FIG. 5 shows a document schema that includes, for each segment class that occurs in a class of documents, a data item indicating a position. FIG. 6 shows a document schema that includes a data item for each segment class that occurs in a class of documents, with the data items linked according to their relative positions within the document. FIG. 7 shows a document schema that includes, for each coordinate, an item of data indicating relative positions of segment classes that occur in a class of documents.

In FIG. 4, alternative position data 110 includes schema group data item 112 linked to K document schemata 114 through 116. Each document schema indicates, for a class of documents, a positioning for a set of segment classes that can occur in documents in the class. At least one of the segment classes is included in more than one of the document schemata. Therefore, the document schemata indicate alternative positionings for at least one of the segment classes.

In order to obtain alternative position data 110 as in FIG. 4, operations can be performed on a large set of documents that is representative of documents that will subsequently be analyzed. Each document can be segmented, and similarity classes of segments can be chosen and assigned identifiers. The documents can be grouped into document classes, with documents in each class including similar combinations of segment classes and with each document class being assigned an identifier. Then measurements can be made to obtain a positioning of segment classes that occur in each document. A positioning can, for example, indicate a segment class' position within a document or a segment class' position relative to segments in other classes. The positionings for documents in each document class can then be grouped into similarity classes. The positionings in each similarity class can be used to obtain position data indicating positions of segment classes that occur in positionings in the class, such as by obtaining central values. These operations can be performed under human control, automatically, or through a combination of human-controlled and automatic operations.

Document schemata 114 through 116 can include document schemata for several different classes of documents, and can include more than one document schema for each class of documents. Further, document schemata 114 through 116 can include document schemata of different kinds, some examples of which are illustrated in FIGS. 5–7.

In FIG. 5, document schema 120 includes document class data item 122, which includes a document class identifier for document class m. Data item 122 is linked to M segment class data items 124 through 126, so that each segment class data can be accessed from data item 122. Each segment class data item includes a segment class identifier for one of the segment classes that occurs in document class m.

Any appropriate combination of segment classes could occur in a document class. For example, for many articles, the segment classes could include title, author, abstract, date, and so forth. For many legal documents, on the other hand, the segment classes could include court, plaintiff, defendant, title, and so forth. For a memorandum, the segment classes could include to, from, subject, date, and so forth.

Each segment class data item is in turn linked to a position data item indicating a position within a document and a search/retrieval data item indicating information about how a segment is stored for use in search and retrieval operations. Segment class data item 124, for segment class 1, is linked to position data item 130, indicating position 1, and to search/retrieval data item 132 indicating storage type 1, while segment class data item 126, for segment class N, is linked to position data item 134, indicating position N, and to search/retrieval data item 136 indicating storage type N.

Position data items 130 and 134 could indicate positions in a number of ways. For example, each position data item could indicate coordinates within a document of the upper left corner, center of area, or another reference position within a segment. Or each position data item could indicate a bounding box of a segment within a document, such as with four coordinates, one each for left, top, right, and bottom sides of the bounding box.

In FIG. 6, document schema 140 includes document class data item 142, similar to data item 112 in FIG. 5, but with a document class identifier for document class n. Data item 142 is linked to the first in a series of segment class data items 144 through 146, and each segment class data item in the series is linked to the next in the same order as the segment classes occur in a document with the positioning indicated by document schema 140.

In FIG. 7, document schema 160 includes document class data item 162, similar to data item 112 in FIG. 5 and data item 142 in FIG. 6, but with a document class identifier for document class p. Data item 162 is linked to horizontal positioning data item 164 and vertical positioning data item 166, each of which indicates a set of constraints on segment class positions. In the example illustrated, data item 164 indicates that the x coordinate of segment class a is less than the x coordinate of segment class b, which in turn is less than the x coordinate of segment class c. Data item 166, on the other hand, indicates that the y coordinates of both segment classes a and c are greater than the y coordinate of segment class b. The x and y coordinates could be measured in any appropriate orthogonal directions from any appropriate reference point, such as from the upper left corner or upper center of a document page.

In implementing the general features described above, alternative position data could include document schemata of any of the types shown in FIGS. 5–7 or any other appropriate type. Rather than including document schemata, alternative position data could include other data items that provide similar information about segment class positionings.

C.2. System

Figure 8:
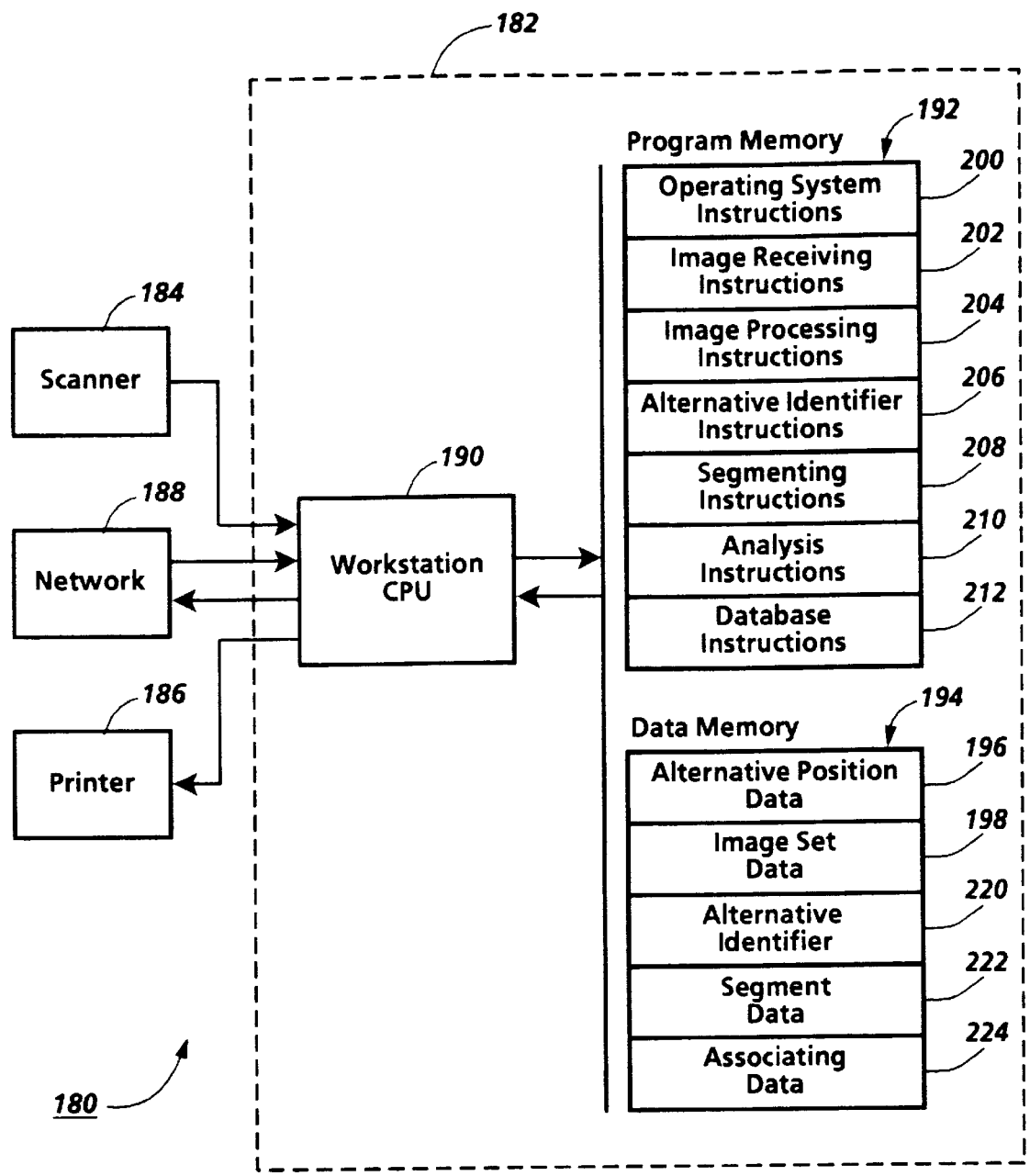
FIG. 8 is a schematic block diagram of a machine that can analyze an image showing a graphical representation of a layout.

The general features described above could be implemented in a wide variety of systems. FIG. 8 shows an example of a system in which the general features could be implemented.

System 180 in FIG. 8 includes workstation 182, a Sun SPARCStation 10 workstation. Scanner 184 can be a conventional scanner such as a Xerox Datacopy GS Plus scanner. Printer 186 can be a conventional printer such as a Xerox laser printer. Network 188 can be a conventional network operating in accordance with a standard protocol, such as the Ethernet protocol.

Workstation CPU 190 is connected to receive data from scanner 184 and network 188 and is connected to provide data to printer 186 and network 188. For example, CPU 190 can receive data defining an image set that shows a document from scanner 184 or from network 188. In addition, workstation CPU 190 is connected to access program memory 192 and data memory 194 and other conventional workstation peripherals (not shown). Data memory 194 stores alternative position data 196 and is also illustratively storing image set data 198 defining an image set showing a document. Data memory 194 could include a disk as illustrated in FIG. 3, and CPU 190 could retrieve data defining an image set from the disk, storing it in a more readily accessible part of data memory 194during image analysis.

Program memory 192 stores instructions CPU 190 can execute to perform operations implementing the general acts in FIG. 2. CPU 190 executes operating system instructions 200 that provide a Unix operating system or other appropriate operating system. Each of the other sets of instructions stored by program memory 192 can be obtained from source code in a conventional programming language such as Lisp, C, or the like with conventional compiler or interpreter techniques that produce object code. A machine can store data indicating the source code or the resulting object code on a data storage medium in manufacturing a software product as described above in relation to FIG. 3, with the source code or object code being stored for access by a storage medium access device when the software product is used in a machine like system 180. When executed, these other instructions make calls to operating system instructions 200 in a conventional manner.

In executing image receiving instructions 202, CPU 190 receives data defining an image set and stores it in data memory 194, as illustrated by image set data 198. The data defining the image set may be received from scanner 184 or network 188.

In executing image processing instructions 204, CPU 190 calls alternative identifier instructions 206 and segmenting instructions 208. Image processing instructions 204 also perform other operations relating to analysis of graphical representations of layouts.

In executing alternative identifier instructions 206, CPU 190 calls analysis instructions 210 to perform basic geometric analysis of the image set defined by image data 198, producing alternative identifier 220. Alternative identifier 220 identifies one of a set of alternative positionings for which alternative position data 196 indicate positions.

Similarly, in executing segmenting instructions 208, CPU 190 calls analysis instructions 210 to perform basic geometric analysis of the image set defined by image data 196, producing segment data 222. Segment data 222 define a segment of the image set defined by image set data 198. The segment is at a position indicated by alternative position data 196 for the alternative positioning identified by alternative identifier 220. Segmenting instructions 208 can include recognition operations on the segment.

In executing database instructions 212, CPU 190 produces associating data 224 which permits database search and retrieval operations in relation to segment data 222.

Associating data 224 can, for example, make it possible to determine that segment data 222 defines a segment of the document shown by the image set defined by image set data 198 or that segment data 222 defines a segment in an identified class of document segments.

C.3. Alternative Identification

Figure 9:
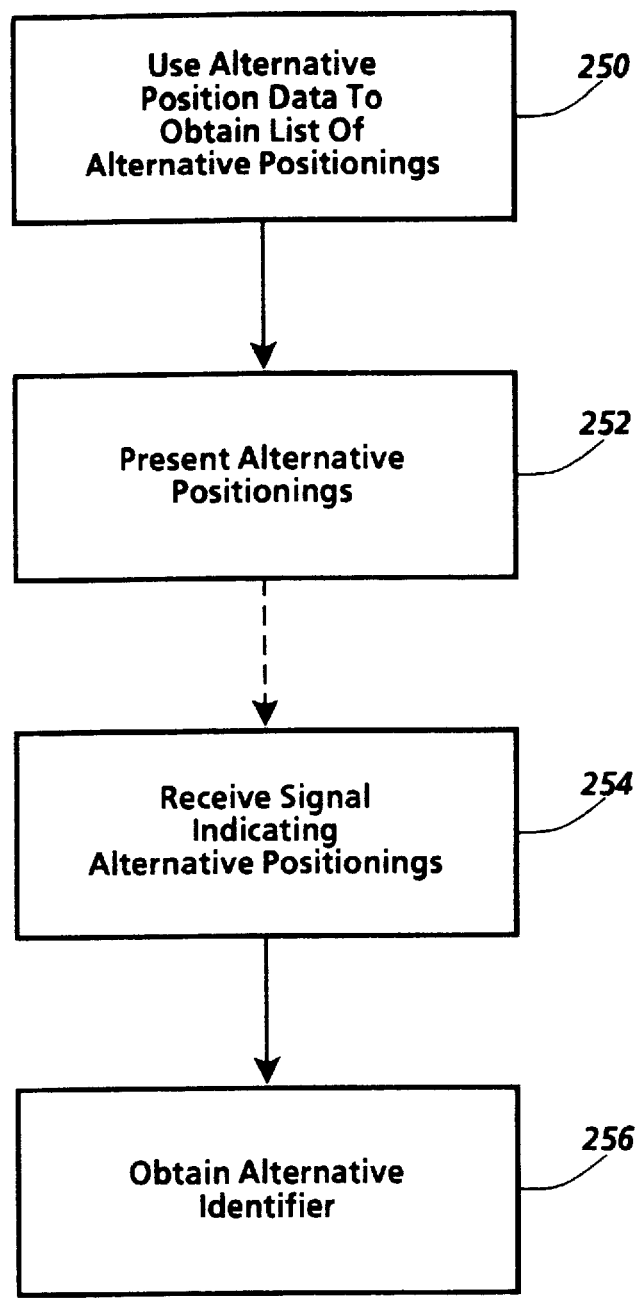
FIG. 9 is a flow chart showing acts performed by the machine of FIG. 8 in obtaining an alternative identifier.

Alternative identifier instructions 206 in FIG. 8 could be implemented in a variety of ways. FIG. 9 shows general steps in one way of implementing alternative identifier instructions.

The act in box 250 in FIG. 9 uses alternative position data 196 to obtain a list of alternative positionings. The act in box 252 then presents the alternative positionings from box 250 to a user so that the user can provide a signal indicating one of the positionings. The act in box 252 could be implemented similarly to the techniques described in U.S. Pat. Nos. 5,060,980 and 5,267,303, both incorporated herein by reference, to produce a form with a field that can be marked to indicate each of the alternative positionings. Data defining the form could then be provided to printer 186 to be printed for a user or to network 188 for transmission to a remote user. The act in box 252 could alternatively be implemented by presenting the alternative positionings on a display so that a user could indicate an alternative positioning using a mouse, keyboard, or other user input device.

The act in box 254 receives a signal indicating an alternative positioning. The signal could include data defining an image showing a form that has been marked to indicate an alternative positioning. Or the signal could include a signal from a user input device.

The act in box 256 responds to the signal by obtaining an alternative identifier identifying the indicated alternative positioning. The act in box 256 can be implemented by analyzing the form to obtain data indicating the field that has been marked. The marked field can then be used to obtain the alternative identifier, using a description of the form that indicates an alternative identifier for each field.

Figure 10:
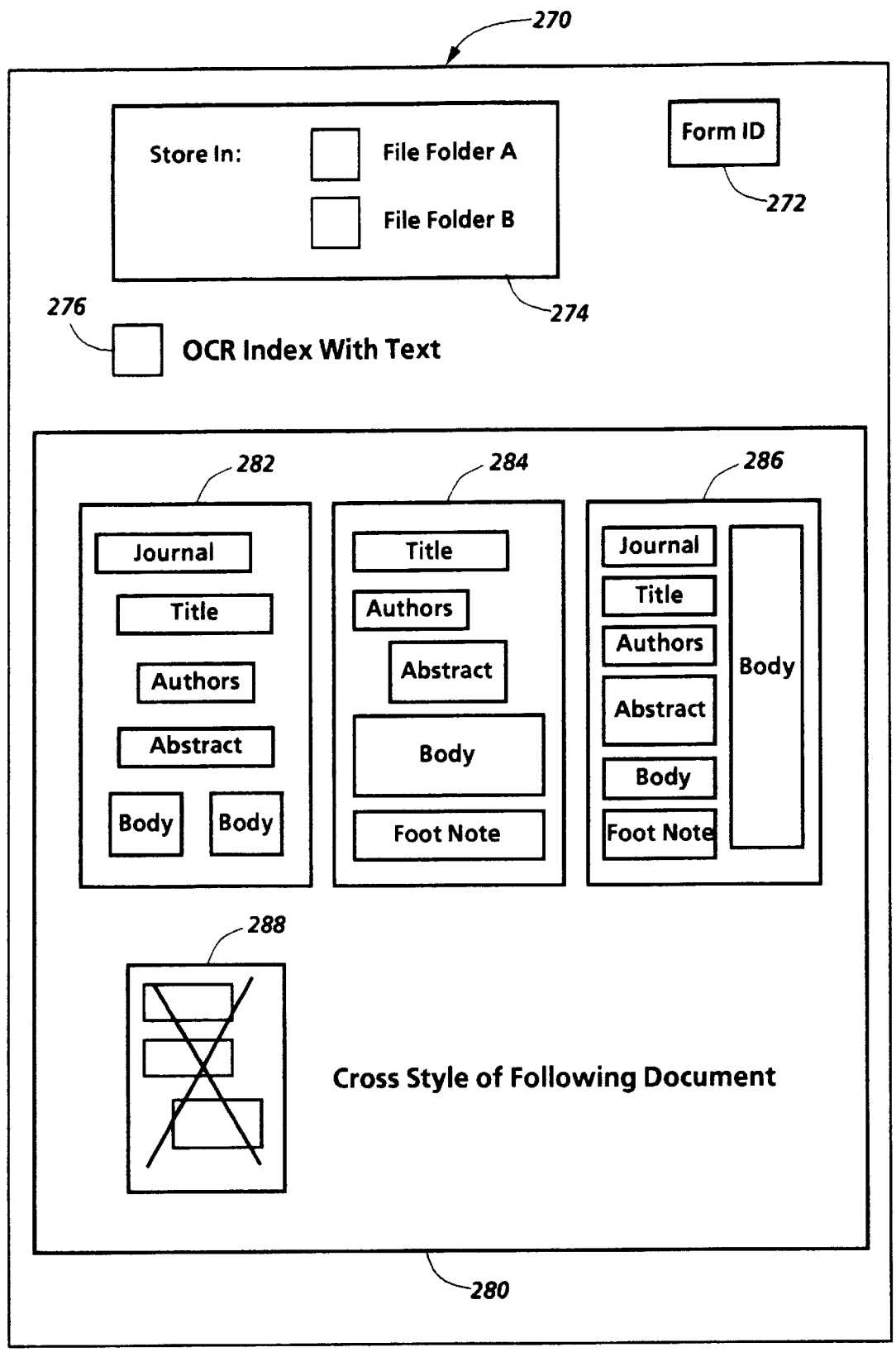
FIG. 10 is a schematic diagram of a form showing alternative positionings with small-scale representations of the first page of a document.
Figure 11:
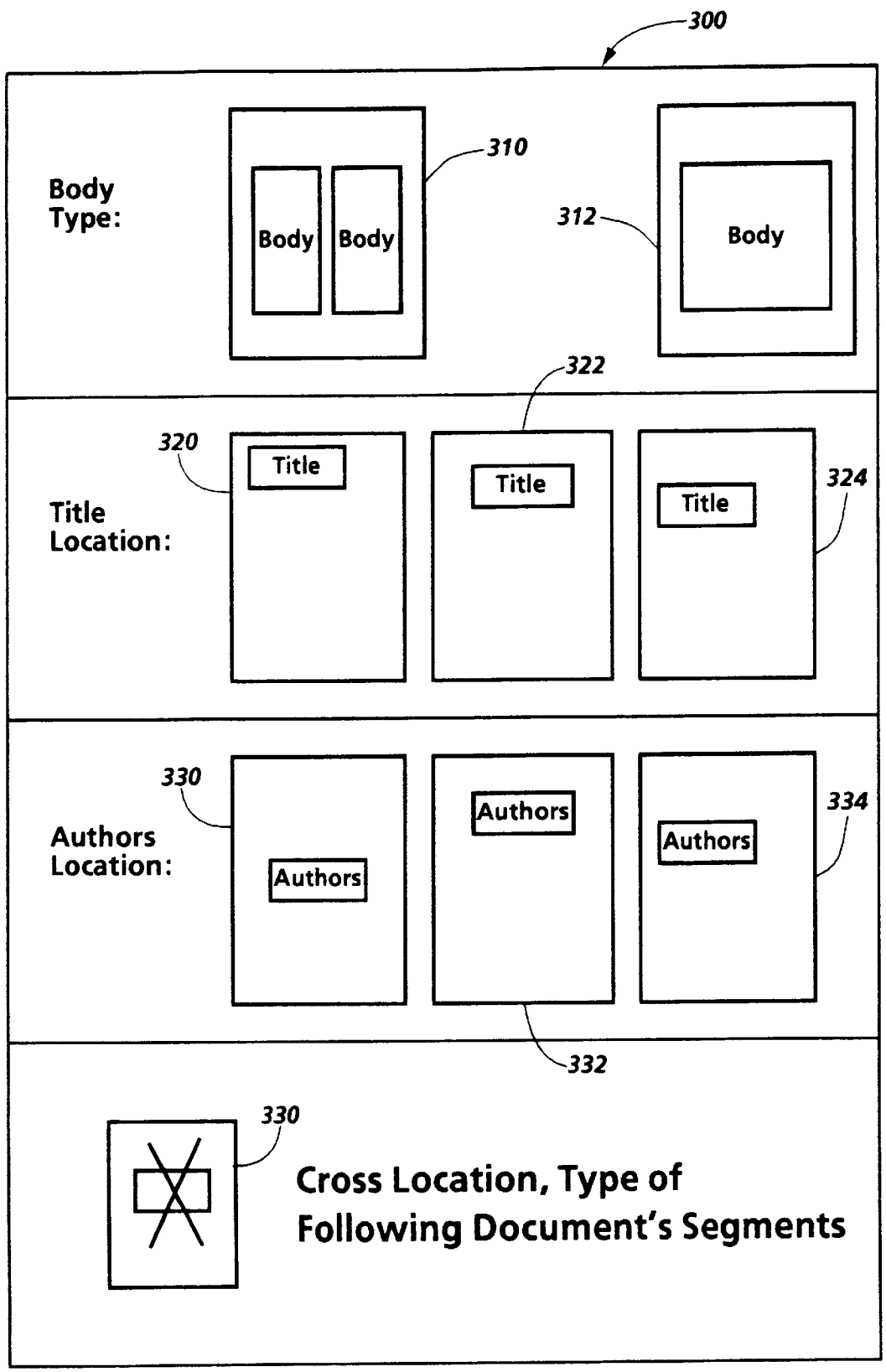
FIG. 11 is a schematic diagram of a segment of a form showing alternative positionings with, for each class of document segments, a small-scale representation of a page in which a segment is positioned.
Figure 12:
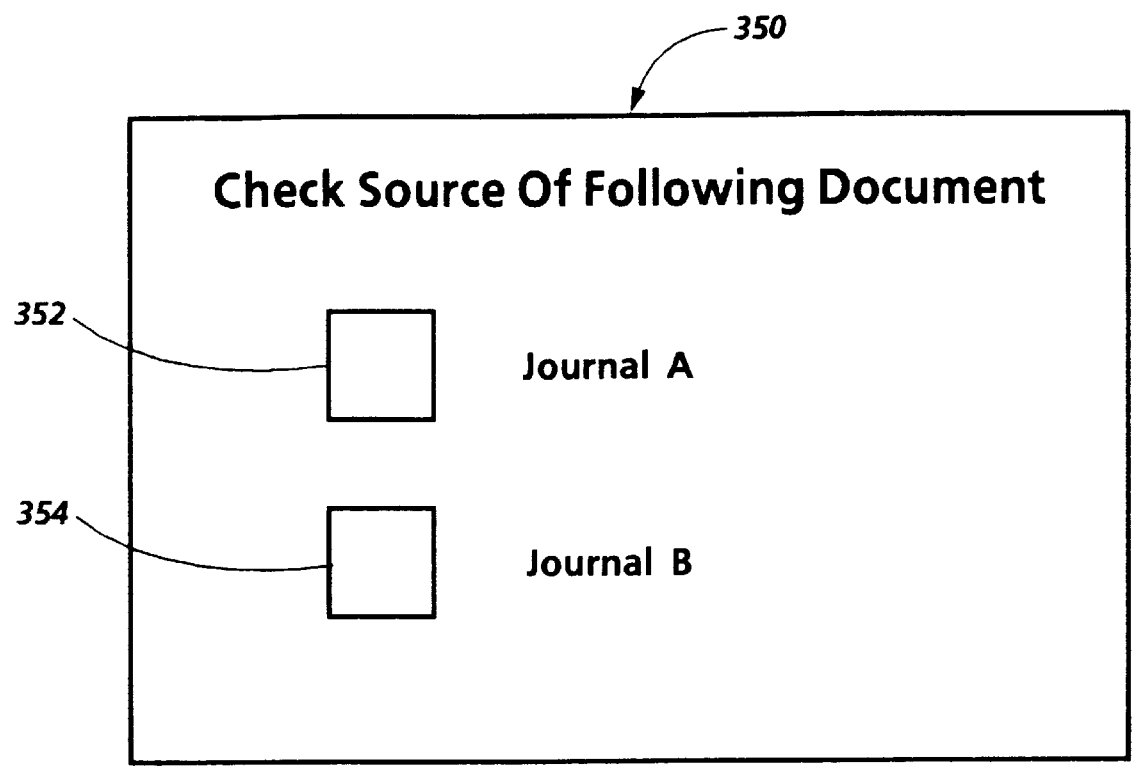
FIG. 12 is a schematic diagram of a segment of a form with fields to indicate the source of a document.

FIGS. 10–12 show forms that could be presented by the act in box 252. FIG. 10 shows a form with fields that show relative positionings of classes of document segments. FIG. 11 shows a form with fields that show positionings of a document segment relative to a page of a document. FIG. 12 shows a form with fields that show names of classes of documents, each with a check box.

Forms as in FIGS. 10–12 enable a user to rapidly provide a large amount of information to system 180 without requiring the user to spend much time or to know a programming language. FIGS. 10 and 11 illustrate forms showing fields, each of which is a "thumbnail template" of a document layout that a user can mark to indicate an alternative positioning. Each form can be used as a cover sheet when a document to be stored is provided to system 180, either through scanner 184 or by a facsimile transmission or other transmission through network 188. Data memory 194 can store a form description that can be used by alternative identifier instructions 206 to obtain an alternative identifier. The alternative identifier could, for example, be a description of a document layout like those described above in relation to FIGS. 5–7, or it could be a pointer, a handle, or another item of data than can be used to access a description of a document layout.

Form 270 in FIG. 10 includes form identifier 272 that CPU 190 can use to retrieve a description of form 270 from data memory 194. Techniques for providing a machine readable form identifier are described in U.S. Pat. No. 5,267,303, incorporated herein by reference. The retrieved form description can then be used to interpret marks made in fields of form 270.

Request segment 274 of form 270 includes fields that a user can mark to indicate a directory into which data defining a following document can be stored. Request segment 274 illustratively includes two fields, each with a check box and a name of an existing directory into which data defining an image set showing a document can be stored.

Field 276 of form 270 includes a check box and an instruction indicating that a user can mark the check box to request optical character recognition (OCR) of text in the document for indexing.

Alternative positioning segment 280 of form 270 includes three fields 282, 284, and 286, and an instruction to cross one of the fields to indicate the style of the following document, where "style" is used to mean the layout of the first page of the document. Each of fields 282, 284, and 286 shows a small scale representation of a first page layout, with each segment shown as a rectangle within which appears a name of the applicable class of document segments. The classes of document segments illustratively include journal, title, authors, abstract, body, and footnote. The first page of the document can be analyzed into segments as indicated on form 270 and OCR can be performed on each segment to obtain words that can be used to index the document.

Information about document segments can be especially important in indexing a document. In general, a search for a document stored by a database system is efficient if a user provides a query that correctly describes the document and if the search produces a relatively small number of candidate documents in response to a query. A user is often likely to remember an important word or phrase, such as a source, a destination, a date, and so forth, that occurs in one segment of a relatively small number of documents but may occur in other segments of many other documents. In this case, unless search can be limited to one class of document segments, an efficient search is not possible. Conventional commercial database search techniques employ segment searching for efficiency. But form 270 in FIG. 10 can be used to request automatic document segment indexing, making segment searching possible in a personal document database.

For form 270, the act in box 256 in FIG. 9 can obtain an alternative identifier that identifies a document style.

FIG. 11 shows alternative positioning segment 300, which could be used in place of alternative positioning segment 280 in FIG. 10. Segment 300 includes three parts and an instruction to cross fields to indicate location and type of the segments of the following document. The first part includes fields 310 and 312, each indicating a positioning of the body relative to a page, referred to as "body type" in FIG. 11. The second part includes fields 320, 322, and 324, each indicating a positioning of the title relative to a page. The third part includes fields 330, 332, and 334, each indicating a positioning of the authors relative to a page. A user can mark fields in the parts of segment 300 to indicate classes of document segments that occur in the following document and to indicate, for each class, a positioning. In effect, a user constructs a layout of a first page of a document.

For segment 300, the act in box 256 in FIG. 9 can obtain an alternative identifier that identifies a positioning of a class of document segments from among the positions shown in segment 300 for the class.

A form as in FIG. 11 could also be modified to request automatic creation of another form like that in FIG. 10, using chunking techniques as described in copending, coassigned U.S. patent application Ser. No. 07/856,107, entitled "Techniques for Automatic Form Creation by Combining Partial Operations," incorporated herein by reference.

FIG. 12 shows alternative positioning segment 350, which could similarly be used in place of alternative positioning segment 280 in FIG. 10. Segment 350 includes fields 352 and 354, each including a check box and a name of a journal. Segment 350 also includes an instruction to check the source of the following document.

The technique illustrated in FIG. 12 is based on the observation that the first page of each document in a journal typically has the same layout, so that simply indicating the source of a document is sufficient to indicate the layout of its first page. In other words, each field in segment 350 indicates an alternative positioning that is the standard layout for the first page of a document in an indicated journal. In response to a mark in one of fields 352 or 354, CPU 190 can access data memory 194 to obtain an alternative identifier identifying the positioning for the indicated journal. More than one journal could have the same alternative positioning.

For segment 350, the act in box 256 in FIG. 9 can obtain an alternative identifier that identifies a standard layout for the first page of a document source.

Presentations similar to the forms in FIGS. 10–12 could be presented on a display, with an instruction to a user to provide a keystroke, mouse click, or other signal to indicate an alternative positioning. The use of forms may be advantageous, however, because a user can provide indexing information necessary for document retrieval using the same facsimile machine or other scanner through which a document is provided. More generally, the appearance of a presentation, whether on a display or a form, can be designed for ease of use, and the specific examples in FIGS. 10–12 could be modified without affecting the underlying process.

C.4. Segment Classes

Figure 13:
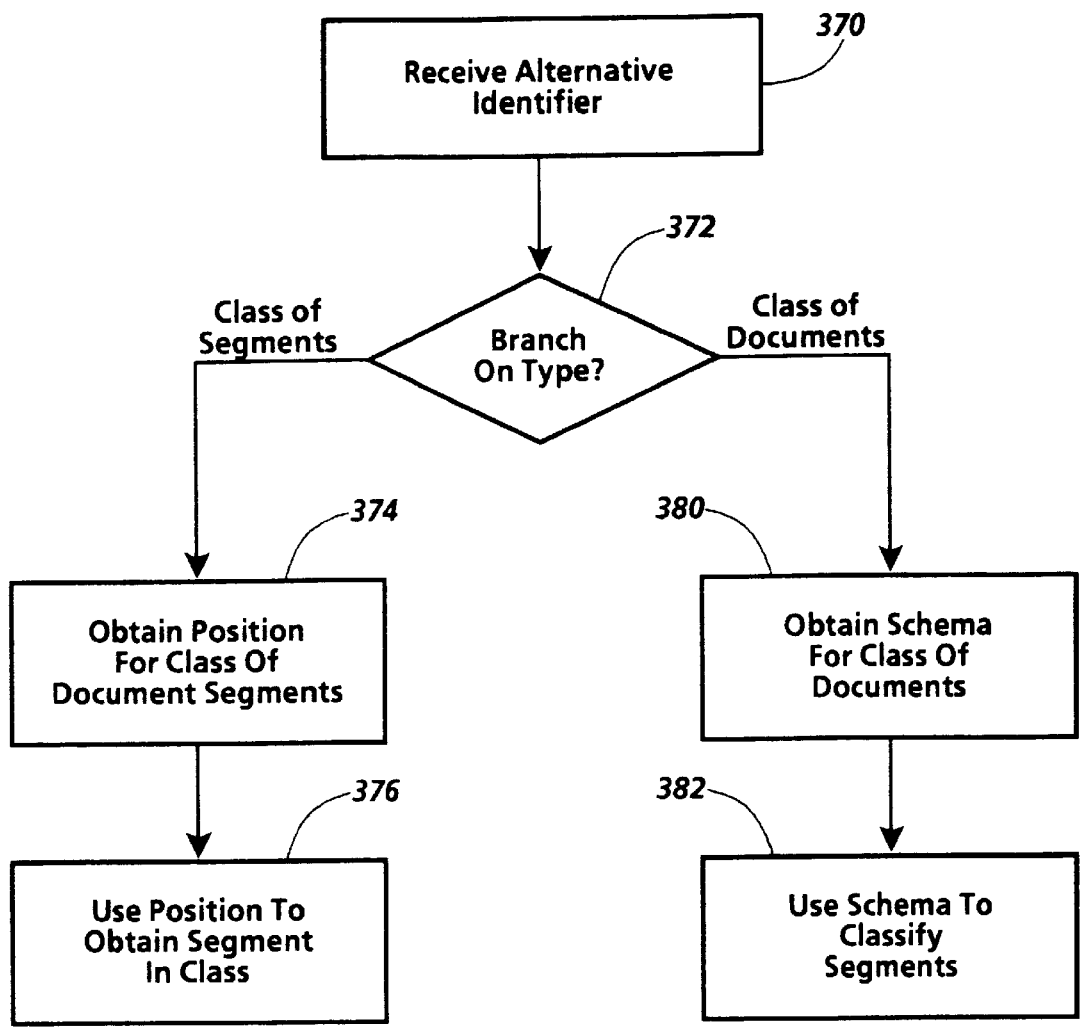
FIG. 13 is a flow chart showing acts performed by the machine of FIG. 8 in segmenting a document.

FIG. 13 shows acts in executing segmenting instructions 208 in FIG. 8.

The act in box 370 in FIG. 13 receives an alternative identifier, which could be obtained in box 256 in FIG. 9 or in any other appropriate way. The alternative identifier could, for example, identify a class of documents, such as by identifying a document style, as discussed above in relation to FIG. 10, or a standard layout for the first page of a document source, as discussed above in relation to FIG. 12; or the alternative identifier could identify a positioning of a class of document segments, as discussed above in relation to FIG. 11.

The act in box 372 branches based on whether the alternative identifier from box 370 identifies a class of documents or a positioning of a class of document segments.

If the alternative identifier is of a type that identifies a positioning of a class of document segments, the act in box 374 obtains data indicating a position for the class. The act in box 374 can be implemented by accessing data like alternative position data 30 in FIG. 1. Alternative position data 30 indicate a position for each alternative positioning.

The act in box 376 can then use the position obtained in box 374 to obtain a segment in the class of document segments. The act in box 376 can be implemented by performing segmentation of text blocks using conventional techniques, and by then finding the segmented text block that is closest to the position obtained in box 374. Segmentation of text blocks can, for example, be performed by calling commercially available recognition software such as ScanworX and TextBridge, available from Xerox Image Systems/Kurzweil, Peabody, Mass. The segmented text block can then be provided as segment data, together with an identifier of the document and an identifier of the class of document segments.

If the alternative identifier is of a type that identifies a class of documents, the act in box 380 obtains data indicating a schema for the class of documents. The act in box 380 can be implemented by accessing data like schema group data item 112 in FIG. 4, obtaining a document schema for the identified class of documents. Or, the alternative identifier could identify a document schema, in which case the document schema could be accessed directly.

The act in box 382 then uses the document schema from box 380 to classify segments of the document, obtaining a segment class identifier for each classified segment. The act in box 382 can be implemented by first performing segmentation of text blocks using conventional techniques and by then using the document schema to obtain each segment's segment class identifier.

The manner in which a document schema is used in box 382 depends on the form of the document schema. For a schema like document schema 120 in FIG. 4, the segment classes can be assigned to the segments in the way that minimizes the error in position or obtains the best fit; the error could be measured, for example, as the sum of the magnitudes, or of the squares, of the differences between each segment's position and the position of the segment's class in the schema. For a schema like document schema 140 in FIG. 5, the segment classes can be assigned to the segments in the same order as in the schema. For a schema like document schema 160 in FIG. 7, fuzzy reasoning techniques can be used to apply the constraints within the schema to the segments, to find the assignment of segment classes that most nearly satisfies all the constraints.

The result of the act in box 382 is a mapping between the segments of a document and the segment classes identified in a document schema.

C.5. Database Operations

Figure 14:
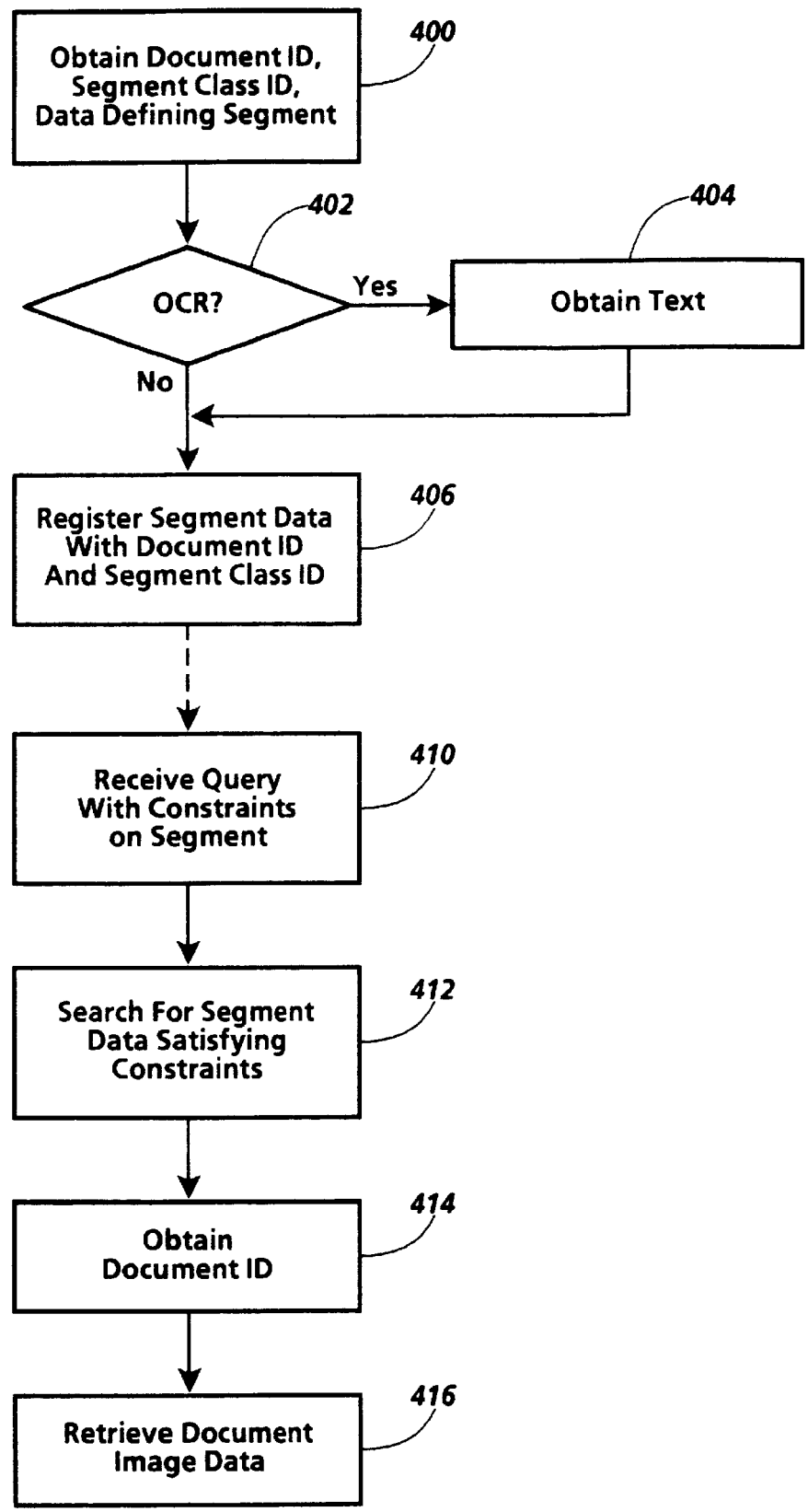
FIG. 14 is a flow chart showing acts performed by the machine of FIG. 8 in storing and retrieving a document.
Figures 15, 16:
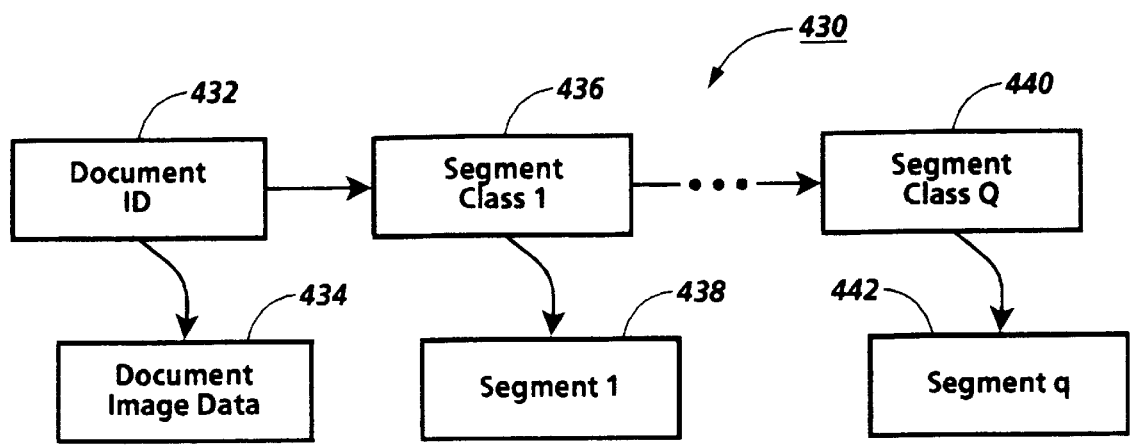
FIG. 15 is a schematic block diagram showing associating data that includes a list.
FIG. 16 is a schematic block diagram showing associating data that includes a table.

Segment data from either of boxes 376 and 382 in FIG. 13 is especially useful in performing database operations, such as storage, search, and retrieval. FIG. 14 illustrates acts that can be performed by an implementation of database instructions 212 in FIG. 8. FIG. 15 illustrates a form of associating data in which a document's segments are associated in a list. FIG. 16 illustrates a form of associating data in which each document in a class is associated with its segment in a table entry.

The act in box 400 begins a storage operation by receiving a document identifier, an identifier of a class of document segments, and data defining a segment of the identified document that is in the identified class of document segments. The segment class identifier and data defining a segment can be obtained as described above in relation to boxes 376 and 382 in FIG. 13. Data defining a segment could take a variety of forms, including a full-scale or reduced bitmap of a segment, an encoding of a segment, data defining a bounding box of a segment within an image, or a pointer to other data defining a segment.

The act in box 402 branches based on whether OCR is to be performed. The act in box 402 can depend on whether a user has marked a check box like the one in field 276 in form 270 in FIG. 10.

If OCR is to be performed, the act in box 404 performs OCR to obtain data indicating text in the segment defined by the data from box 400. The act in box 404 can be performed using conventional OCR techniques.

The act in box 406 then completes the storage operation by registering segment data, which may include data defining a segment from box 400, data indicating text in a segment from box 404, or both. The segment data can be registered by associating it with a document identifier and a segment class identifier, as described below in relation to FIGS. 15 and 16. The act in box 406 can be implemented with conventional database storage techniques.

The storage operation can be followed by a retrieval operation, as suggested by the dashed line in FIG. 14. The retrieval operation can begin in box 410 by receiving query data that indicate constraints on a document segment. The query data can indicate, for example, a class of document segments such as author, title, source, abstract, defendant, plaintiff, court, file number, and so forth. The query data can also indicate a constraint on the content of the segment, such as a boolean combination of keywords, each provided in either text or image form.

The act in box 412 then uses the query data to perform a search operation to find segment data that satisfy the indicated constraints. The act in box 412 can be implemented with conventional database search techniques, if the segment data stored in box 406 includes data indicating text.

Database storage and retrieval techniques that can be used to implement the acts in boxes 406 and 412 are described in Wiederhold, G., *File Organization for Database Design*, McGraw-Hill, 1987, incorporated herein by reference.

If segment data are found that satisfy the constraints from the query data, the act in box 414 obtains a document identifier identifying the document that includes the segment. The act in box 416 then uses the document identifier to obtain data defining an image set that shows the document.

The acts in boxes 414 and 416 can be implemented as described below in relation to FIGS. 15 and 16.

The techniques in FIG. 14 can replace labor intensive image filing and indexing techniques in which a document image is scanned, filed on a storage device, and indexed by manually using a workstation keyboard to enter key information about the document such as where it is stored, its title, its author, its source, and so on. The techniques in FIG. 14 can also replace OCR full text indexing, which may give equal status to information from all segments of a document, including not only its body but also bibliographic segments such as author, title, source, and so forth. The techniques in FIG. 14 enable a user to quickly and easily scan and store a document, indexing it both by content and by bibliographic information. The techniques in FIG. 14 can be used in batch mode document storage, further reducing the amount of time invested by the user.

List 430 in FIG. 15 illustrates one form of associating data. Data item 432 in list 430 includes a document identifier that can be used to access and retrieve document image data 434. Data item 432 also includes a pointer to data item 436, which is the first in a series of Q similar data items, each for a segment of the document shown by document image data 434.

Data item 436 includes data indicating a class of document segments, referred to as segment class 1, and which also includes segment data 438 for segment 1. Segment data 438 can be included directly in data item 436, in the form of data defining segment 1 or data indicating text from segment 1.

Segment data 438 could also be included in data item 436 indirectly, using a pointer, a location in document image data 432, or other data indicating how segment data 438 can be obtained. Data item 436 also includes a pointer to the next data item in the series, and the series ends with data item 440.

Data item 440, like data item 436, includes data indicating segment class Q and segment data 442 for segment q. Segment data 442 can be included as described above in relation to segment data 438.

In searching a number of lists like list 430, the act in box 412 in FIG. 14 can first apply any constraints on the class of document segments to obtain the data items in each list that are for segments that satisfy such constraints. The act in box 412 can then apply constraints on content only to the segment data included in those data items that satisfy constraints on the class of document segments. Upon finding segment data that satisfy all the constraints, the act in box 414 can access the list that includes the segment data to find the document identifier. The act in box 416 can then use the document identifier to access the document image data.

Table 450 in FIG. 16 illustrates another form of associating data. Table 450 includes entries for a class of documents referred to as document class R. The first field of illustrative entry 452 includes a document identifier, "0001," which can be used to access document image data defining an image set that shows a document. The following fields include one field for each of the classes of document segments that occur in a class of documents. Each field in an entry can either include segment data or a pointer to segment data. In entry 452, the field for segment class 1 includes the title "Cowherds of the Deep." The field for segment class 2 includes the author, "Snoopy." The field for segment class 3 includes text that begins with the words "It was a dark . . . "

In searching a number of tables like table 450, the act in box 412 in FIG. 14 can first apply any constraints on the class of documents to determine whether table 450 satisfies such constraints. If so, the act in box 412 can then apply any constraints on the class of document segments to obtain the segment classes that satisfy such constraints. The act in box 412 can then apply constraints on content only to items in fields for segment classes that satisfy the constraints on the class of document segments. Upon finding an entry with a field that includes segment data satisfying all the constraints, the act in box 414 can obtain the entry's document identifier. The act in box 416 can then use the document identifier to access the document image data.

C.6. Variations

Some implementations described above apply a top down approach to obtain information about a class of document segments applicable to a specific segment, using a document schema or other prior knowledge about document classes to classify segments. Other implementations might apply a bottom up approach in which the content of a segment is used to determine its class, and alternative positionings of segments in the same class being obtained by clustering positions. It might also be possible to combine both top down and bottom up approaches, trying top down, but then trying bottom up if top down fails.

The implementations described above include certain classes of documents and certain classes of document segments. The invention might be implemented with a wide variety of other classes of documents and other classes of document segments. For example, documents segments could be classified as halftones, text, and so forth, with each class of segments then being handled appropriately during recognition, storage, or other subsequent operations.

Some implementations described above use alternative identifiers that are obtained based on marks on a form, which can be a cover sheet of a document being scanned. The invention might also be implemented with a user interface in which a user can indicate an alternative positioning without marking a form, such as by providing signals from a keyboard or mouse. Alternative identifiers might also be obtained automatically, such as by automatically obtaining data indicating a document's class, using the document class to obtain a set of schemata for that class, and then applying each schema to find the one that results in the best fit with the document.

The implementations described above use conventional segmentation techniques to obtain a text block for which a class of document segments can be obtained. Segmentation techniques might also be developed that resolve ambiguities using document schema, in effect finding a segmentation that matches a document schema.

The implementations described above permit search operations using conventional database search techniques which compare words in text. As techniques for image comparison are developed, search operations could be extended to use image comparison.

Figure 17:
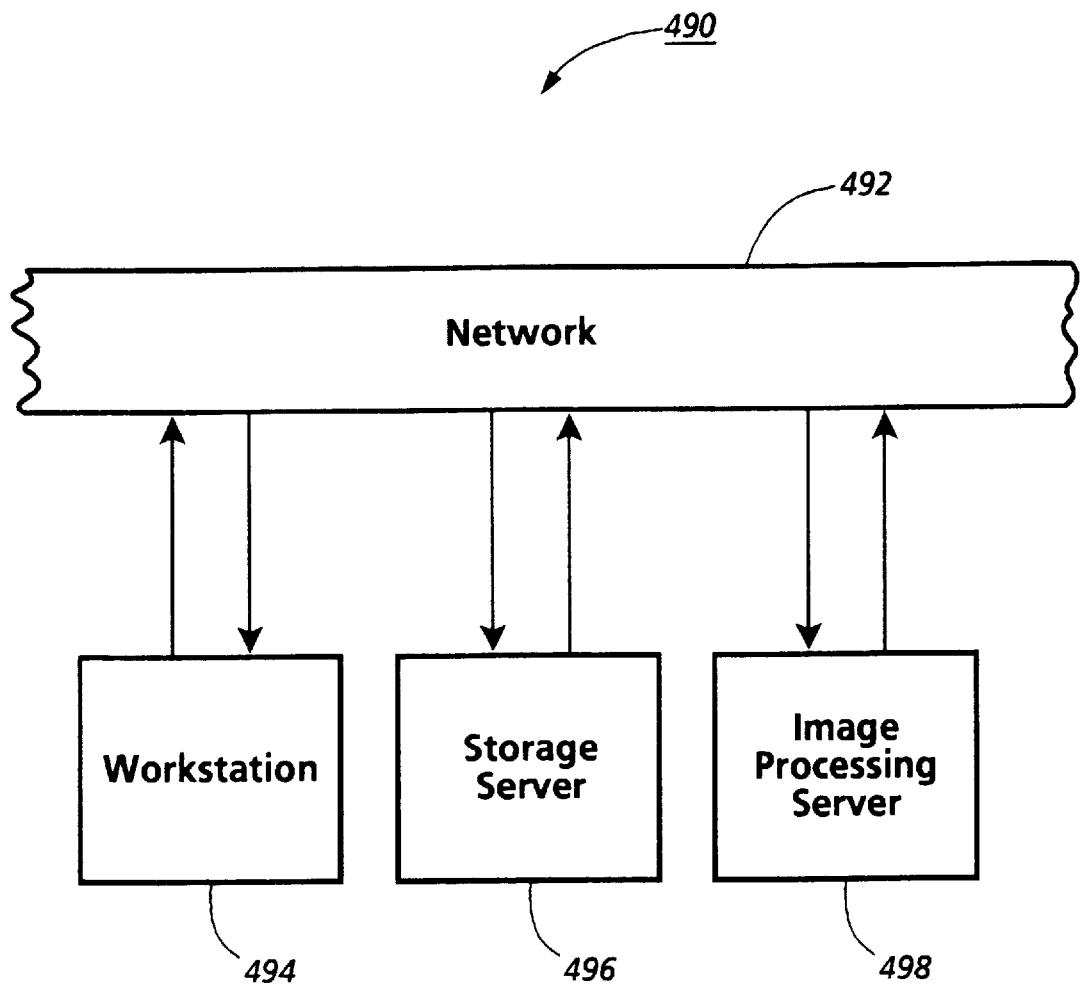
FIG. 17 is a schematic block diagram of an implementation with an image processing server.

The implementations described above in relation to FIG. 8 employ a workstation CPU that executes image processing instructions. FIG. 17 shows an alternative implementation that uses an image processing server. This implementation can provide the usual advantages of server architectures, including economy, speed, and sharing of resources.

System 490 in FIG. 17 includes network 492, workstation 494, storage server 496, and image processing server 498. A user can operate workstation 494 to provide requests on network 492 for storage of data defining images, such as from a scanner or other source. In response, storage server 496 can store the data. Then, the user can operate workstation 494 to provide requests for image processing operations like those described above. In response, image processing server 498 can perform the requested operations, executing instructions like those described above in relation to FIG. 8.

D. Application

Figure 18:
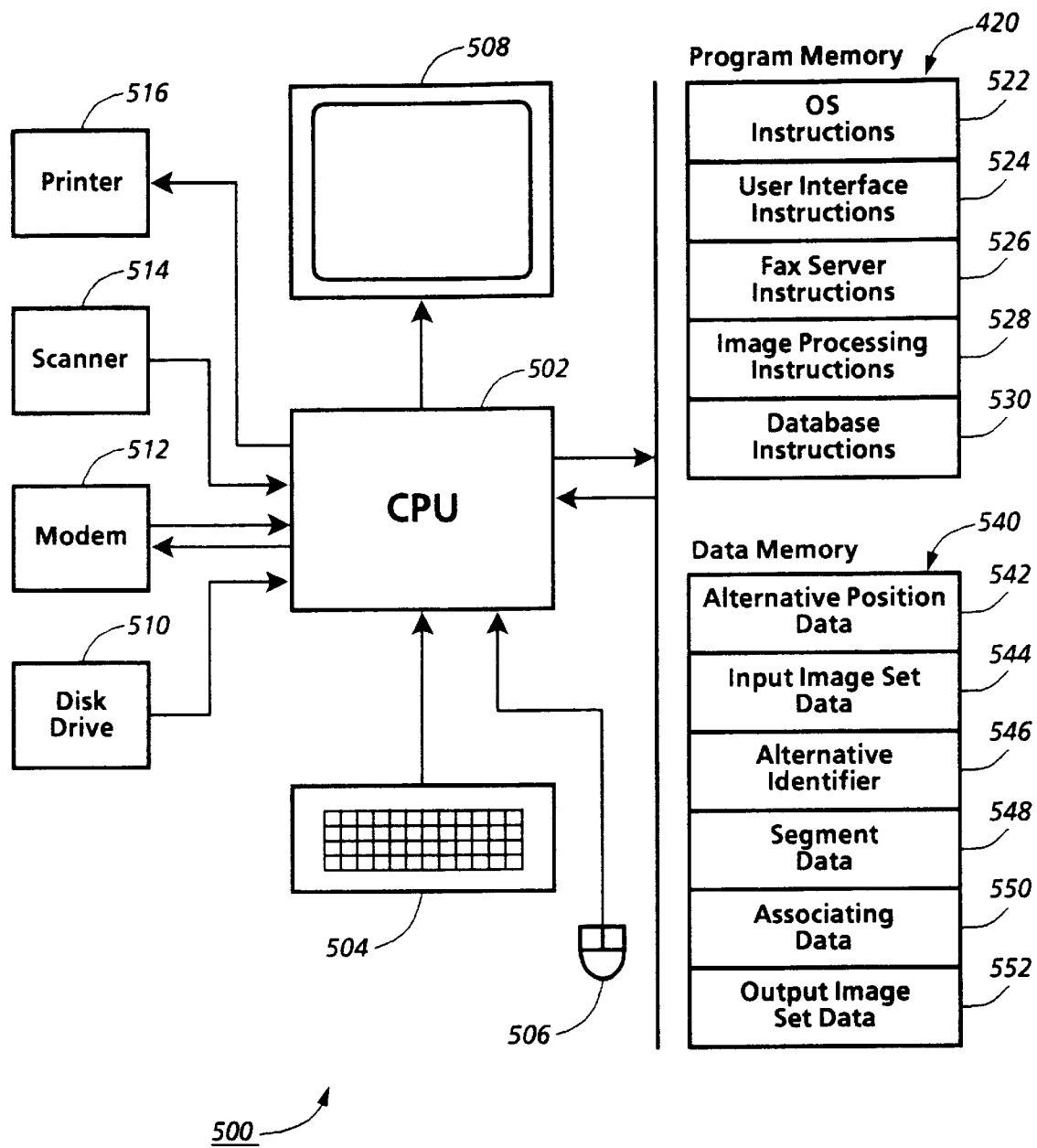
FIG. 18 is a schematic block diagram of a fax server application.
Figure 19:
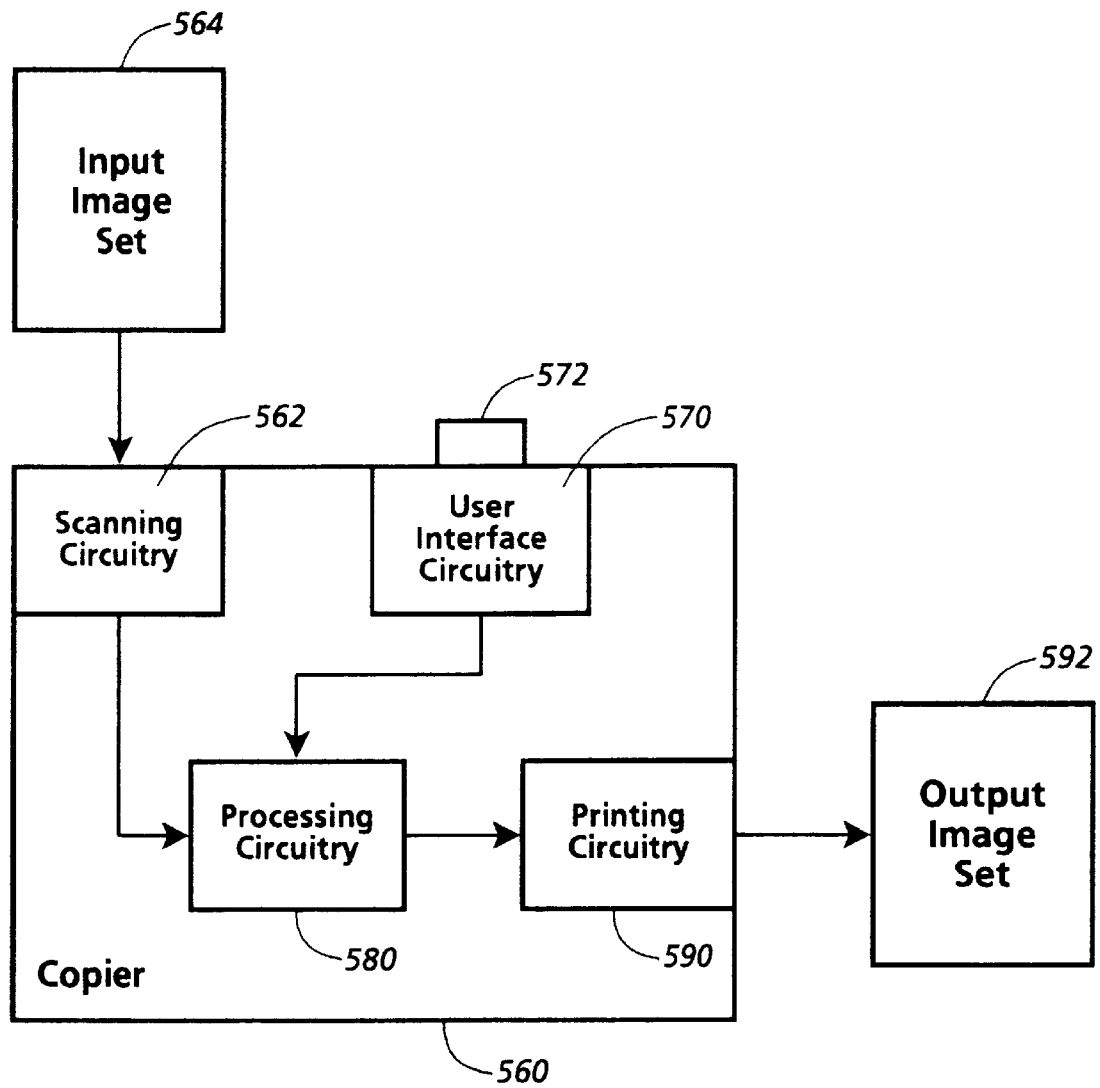
FIG. 19 is a schematic block diagram of a copier application.

The invention could be applied in many ways, because may important document processing applications depend on segmentation of an image showing a document into classes of document segments. FIG. 18 shows how the techniques described above could be applied in a personal computer that can operate as a fax server. FIG. 19 illustrates how the techniques described above could be applied in a copier.

System 500 in FIG. 18 includes CPU 502, which can be the CPU of a personal computer such as an IBM PC compatible machine. CPU 502 is connected to receive user input signals from keyboard 504 and mouse 506, and can present images to a user through display 508. CPU 502 is also connected to a number of other peripheral devices, illustratively including disk drive 510, modem 512, scanner 514, and printer 516.

Program memory 520 stores operating system (OS) instructions 522, which can be a version of DOS; user interface instructions 524; fax server instructions 526; image processing instructions 528; and database instructions 530. Fax server instructions 526 and database instructions 530 can be similar to the PaperWorks™ software product described in copending, coassigned U.S. patent application Ser. No. 08/096,198, entitled "Data Access Based on Human-Produced Images," incorporated herein by reference, and can include the features described above in relation to FIG. 14. Image processing instructions 528 can be implemented as described above in relation to image processing instructions 204 in FIG. 8 and in relation to FIGS. 9 and 13. Fax server instructions 526, image processing instructions 528, and database instructions 530 could be obtained in the form of a software product stored on a floppy disk, diskette, or CD-ROM, and accessed for storage in program memory 520 by disk drive 510.

Data memory 540 stores alternative position data 542, input image set data 544, alternative identifier 546, segment data 548, and associating data 550, as described above in relation to FIGS. 8, 9, and 13–16. Data memory 540 can also store output image set data 552, defining an automatically created form as illustrated in FIGS. 10–12 or retrieved document image data as described in relation to FIG. 14.

System 500 can obtain input image data 544 defining an image set that shows a document and a form requesting segmentation and storage of the document from several sources: Data defining an image set showing a document and a form could be obtained from scanner 514. A user could produce data defining an image showing a document and a form elsewhere and provide it to system 500 through modem 512, such as by making a facsimile transmission to modem 512.

CPU 502 could execute fax server instructions 526 in response to a request received by facsimile transmission through modem 512. The request could include a form indicating a database operation and also indicating an output image destination such as a fax machine or printer 516. The request could also include data defining an image showing a document or could indicate an image previously obtained by system 500.

Fax server instructions 526 could include calls to image processing instructions 528 to perform acts like those shown in FIGS. 8, 9, 13, and 14 if the request indicates a storage operation. Execution of fax server instructions 526 could further include calls to database instructions 530 to perform acts like those shown in FIG. 14 if the request includes a retrieval operation, providing data defining an output image set showing a retrieved document, which could be provided to modem 512 for facsimile transmission or to printer 516 for printing.

In FIG. 19, copier 560 can be a digital copier or other electronic reprographics system. Scanning circuitry 562 obtains data defining input image set 564 showing a document and a form requesting storage and segmentation, or showing a form requesting retrieval. User interface circuitry 570 includes touch sensing device 572, which can be a push button, a heat or pressure sensitive element, a capacitance sensing element, or other device for sensing a touching action. When a user touches device 572, user interface circuitry 570 provides touch data indicating that device 572 has been touched.

Processing circuitry 580 uses the touch data to obtain request data indicating a request for a scanning operation. Then, responding to a request for segmentation and storage, processing circuitry 580 uses data defining input image set 564 to automatically obtain segment data and associating data as described above. Subsequently, responding to a request for retrieval, processing circuitry 580 can use the segment data and the segment position data to obtain data defining an output image set showing a retrieved document. This data is provided to printing circuitry 590 for printing of output image set 592.

E. Miscellaneous

The invention has been described in relation to software implementations, but the invention might be implemented with specialized hardware.

The invention has been described in relation to implementations using serial processing techniques. The invention might also be implemented with parallel processing techniques.

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

What is claimed:

1. A method for obtaining segment data contained in a document, said method comprising the steps of:

storing alternative position data in a storage means, said alternative position data indicating a set of two or more alternative positionings on a document for a class of document segments;

obtaining image set data, the image set data representing said document;

providing a user with means for specifying an alternative identifier, said alternative identifier identifying one of the two or more alternative positionings;

receiving an alternative identifier specified by said user; and using the alternative identifier and the alternative position data to obtain the segment data from the image set data.

2. The method of claim 1, further comprising:

obtaining a document identifier identifying the document; and storing the segment data and the document identifier so that a search can determine that the segment defined by the segment data is a segment of the document identified by the document identifier.

3. The method of claim 1, further comprising:

obtaining a segment class identifier identifying the class of document segments; and storing the segment data and the segment class identifier so that a search can determine that the segment defined by the segment data is in the class identified by the segment class identifier.

4. The method of claim 1, further comprising:

performing recognition on the segment defined by the segment data.

5. The method of claim 1 in which the act of storing alternative position data comprises:

storing a schema for each of a set of document classes; each class' schema indicating a position for the class of document segments.

6. The method of claim 5 in which the position is indicated relative to the document.

7. The method of claim 5 in which the position is indicated relative to other classes of document segments.

8. The method of claim 1 in which the act of obtaining image set data comprises:

receiving the image set data; the image set data including data indicating the alternative identifier; and the act of receiving an alternative identifier specified by said user comprises:

using the image set data to obtain the alternative identifier.

9. The method of claim 8 in which the image set data further represents a form; the form having, for each of the two or more alternative positionings, a field that can be marked to indicate the alternative positioning; the act of using the image set data to obtain the alternative identifier comprising:

obtaining marked field data indicating a field of the form that has been marked; and using the marked field data to obtain the alternative identifier.

10. The method of claim 9 in which the field for each of the two or more alternative positionings shows relative positionings of two or more classes of document segments for a class of documents.

11. The method of claim 9 in which the field for each of the two or more alternative positionings shows a positioning of a document segment relative to a page of a document.

12. The method of claim 9 in which the field for each of the two or more alternative positionings shows a name of a class of documents and a check box.

13. The method of claim 9 in which the alternative position data includes a description of the form.

14. The method of claim 1 in which the act of using the alternative identifier and the alternative position data to obtain segment data from the image set data comprises:

using the alternative identifier and the alternative position data to obtain segment position data indicating a position of the segment; and using the segment position data and the image set data to obtain the segment data.

15. A machine for obtaining segment data contained in a document, said machine comprising:

image input circuitry for obtaining image set data as input, said image set data representing said document;

memory for storing alternative position data, said alternative position data indicating two or more alternative positionings on a document for a class of document segments;

processing circuitry connected for receiving image set data from the image input circuitry and connected to the memory for accessing said alternative position data stored in the memory, said processing circuitry comprising:

circuitry for obtaining an alternative identifier; the alternative identifier identifying one of the set of alternative positionings; and circuitry for using the alternative identifier and the alternative position data, and the image set data to obtain segment data from the image set data.

16. The machine of claim 15 in which the input image circuitry is connected for receiving facsimile transmissions.

17. The machine of claim 15 wherein the memory is further for storing a database system for associating data stored in the memory and the processing circuitry further comprising:

circuitry for storing the segment data and the image set data in the database system; and circuitry for obtaining associating data associating the segment data and the image set data in the database system.

18. The machine of claim 15 in which the machine is a fax server.

19. The machine of claim 15 in which the machine is a copier.

20. An article of manufacture comprising:

a storage medium for use in an image processing system, said storage medium having program instructions stored therein, said instructions for obtaining segment data contained in a document, said program instructions comprising:

instructions for accessing alternative position data; the alternative position data indicating a position for each of a set of two or more alternative positionings that a class of document segments could have;

instructions for receiving image set data from image input circuitry coupled to said image processing system; the image set data representing a document;

instructions for providing a user with means for specifying an alternative identifier, said alternative identifier identifying one of the set of two or more alternative positionings;

instructions for obtaining an alternative identifier specified by the user; and instructions for using the alternative identifier, the alternative position data, and the image set data to obtain segment data.

* * * * *